(12) United States Patent
Sawabe et al.

(10) Patent No.: US 11,966,096 B2
(45) Date of Patent: Apr. 23, 2024

(54) LENS BODY BONDING STRUCTURE, IMAGE READING DEVICE, AND METHOD FOR BONDING LENS BODY

(71) Applicant: Mitsubishi Electric Corporation, Tokyo (JP)

(72) Inventors: Toshiyuki Sawabe, Tokyo (JP); Takami Urasaki, Tokyo (JP); Takashi Maekawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 642 days.

(21) Appl. No.: 17/278,665

(22) PCT Filed: Apr. 12, 2019

(86) PCT No.: PCT/JP2019/016001
§ 371 (c)(1),
(2) Date: Mar. 23, 2021

(87) PCT Pub. No.: WO2020/090136
PCT Pub. Date: May 7, 2020

(65) Prior Publication Data
US 2022/0043232 A1    Feb. 10, 2022

(30) Foreign Application Priority Data
Oct. 31, 2018    (JP) .................................. 2018-205597

(51) Int. Cl.
*G02B 7/02*    (2021.01)
*G02B 3/00*    (2006.01)
(Continued)

(52) U.S. Cl.
CPC ............. *G02B 7/023* (2013.01); *G02B 3/005* (2013.01); *G02B 3/0075* (2013.01);
(Continued)

(58) Field of Classification Search
CPC ...... G02B 7/023; G02B 3/005; G02B 3/0075; H04N 1/00559; H04N 1/0306; H04N 1/0318
(Continued)

(56) References Cited

U.S. PATENT DOCUMENTS

| | | |
|---|---|---|
| 2005/0161583 A1 | 7/2005 | Matsumoto |
| 2011/0007368 A1 | 1/2011 | Saito |

(Continued)

FOREIGN PATENT DOCUMENTS

| | | |
|---|---|---|
| JP | 11-41410 A | 2/1999 |
| JP | 2005-217630 A | 8/2005 |

(Continued)

OTHER PUBLICATIONS

International Search Report and Written Opinion dated Jul. 16, 2019, received for PCT Application PCT/JP2019/016001 Filed on Apr. 12, 2019, 9 pages including English Translation.
(Continued)

*Primary Examiner* — Joseph P Martinez
*Assistant Examiner* — Grant A Gagnon
(74) *Attorney, Agent, or Firm* — XSENSUS LLP

(57) ABSTRACT

A first lens body and a second lens body are fixed to, using an adhesive layer, a surface of a lens fixing plate determined by intersection of a straight line in an optical axis direction and a straight line in a longitudinal direction, such that the lens fixing plate in which a lens fixing plate opening is formed in a lateral direction overlaps, when viewed in the lateral direction, at least a portion of a junction at which the first lens body and the second lens body are bonded to each other. A first adjustment member is brought into contact with the first lens body via at least one hole into which the first adjustment member is inserted A second adjustment member is brought into contact with the second lens body via at least (Continued)

one hole and into which the second adjustment member is inserted.

25 Claims, 18 Drawing Sheets

(51) Int. Cl.
  *H04N 1/00* (2006.01)
  *H04N 1/03* (2006.01)
  *H04N 1/031* (2006.01)

(52) U.S. Cl.
  CPC ....... *H04N 1/00559* (2013.01); *H04N 1/0306* (2013.01); *H04N 1/0318* (2013.01)

(58) Field of Classification Search
  USPC ........................................................ 359/822
  See application file for complete search history.

(56) References Cited

U.S. PATENT DOCUMENTS

| | | |
|---|---|---|
| 2013/0181311 A1 | 7/2013 | Sugiyama |
| 2016/0037011 A1 | 2/2016 | Fujiuchi et al. |

FOREIGN PATENT DOCUMENTS

| | | |
|---|---|---|
| JP | 2010-187187 A | 8/2010 |
| JP | 2013-168925 A | 8/2013 |
| JP | 2016-197810 A | 11/2016 |
| TW | 201032573 A | 9/2010 |
| WO | 2010/106656 A1 | 9/2010 |
| WO | 2014/148237 A1 | 9/2014 |

OTHER PUBLICATIONS

Notice of Reasons for Refusal dated Mar. 17, 2020, received for JP Application 2020-504417, 9 pages including English Translation.
Office Action dated Jan. 30, 2022, in corresponding Chinese patent Application No. 201980069166.X, 37 pages.

FIG.1
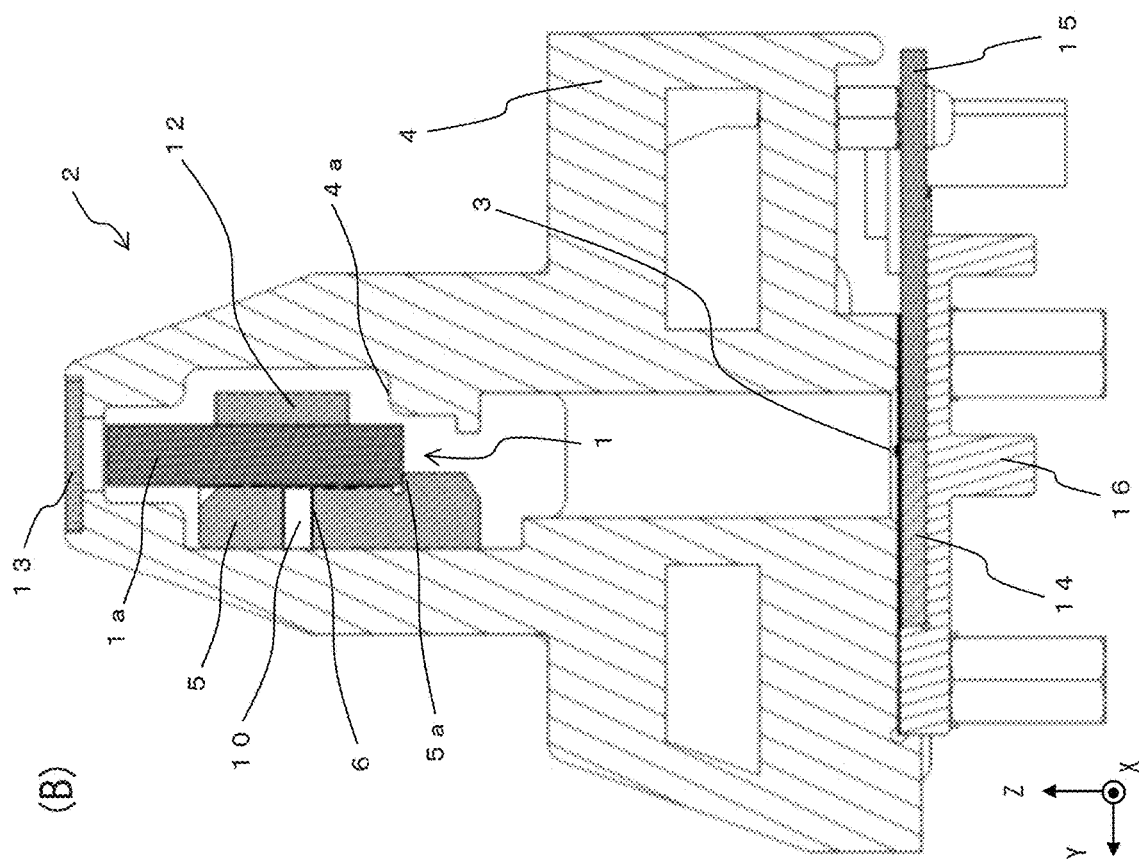
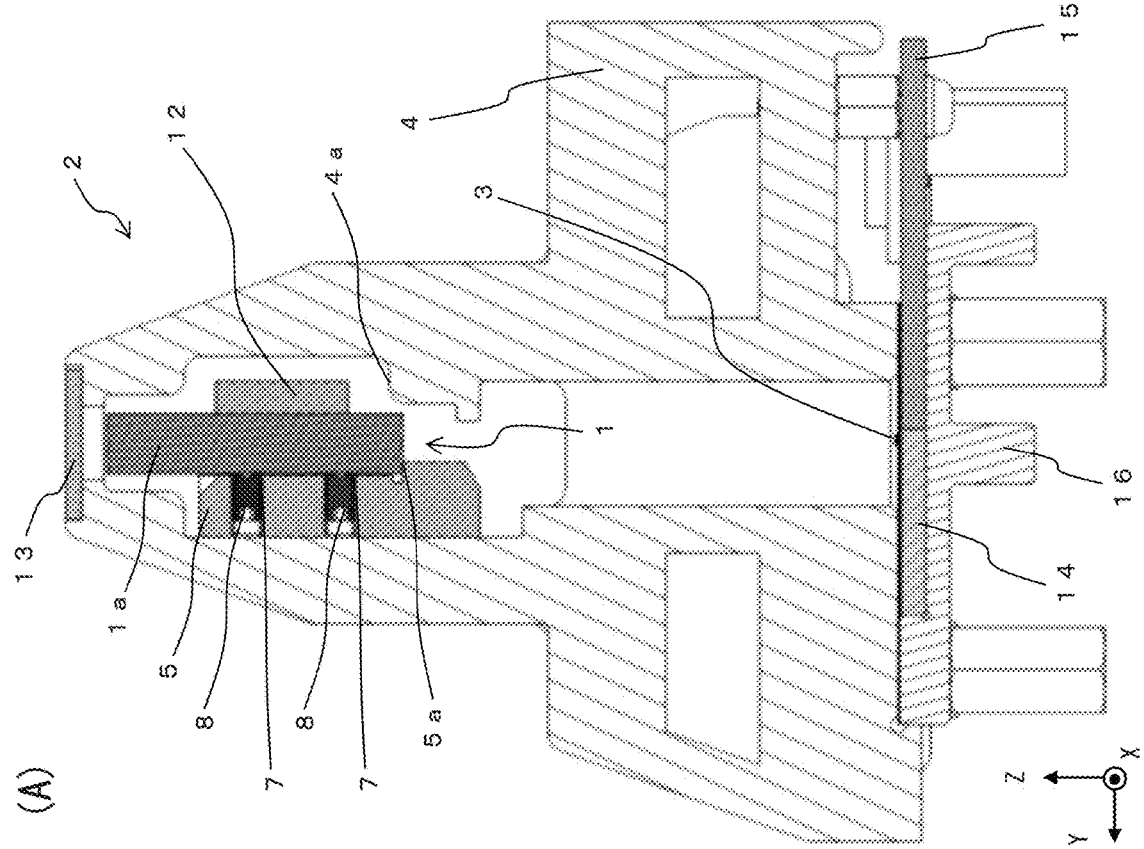

FIG.3
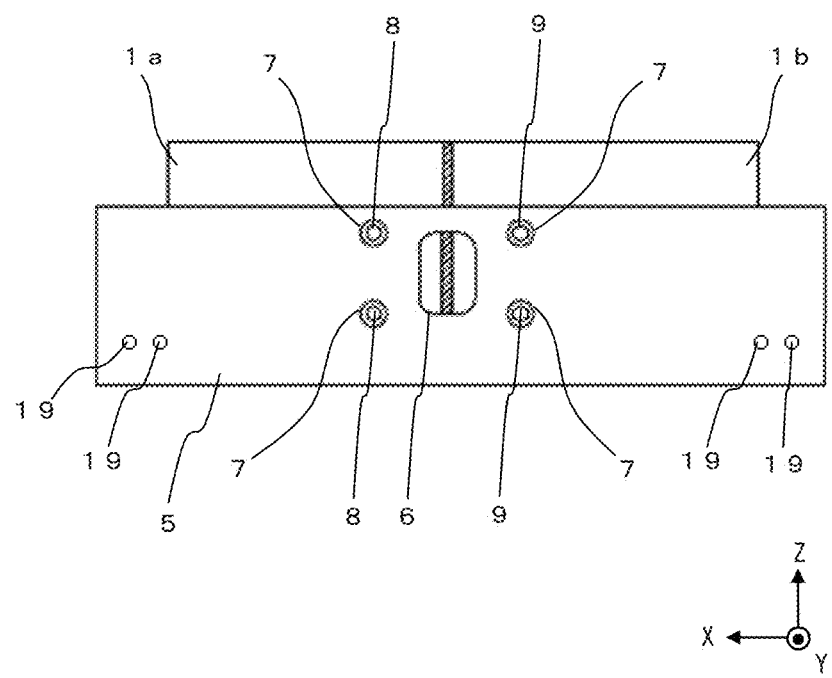
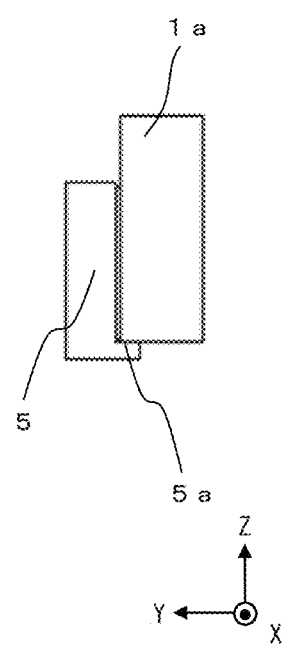

LENS BODY BONDING STRUCTURE, IMAGE READING DEVICE, AND METHOD FOR BONDING LENS BODY

CROSS-REFERENCE TO RELATED APPLICATIONS

The present application is based on PCT filing PCT/JP2019/016001, filed Apr. 12, 2019, which claims priority to JP 2018-205597, filed on Oct. 31, 2018, the entire contents of each are incorporated herein by reference.

TECHNICAL FIELD

The present disclosure relates to a lens body bonding structure having a structure of bonded lens bodies, an image reading device, and a lens body bonding method.

BACKGROUND ART

An image reading device is conventionally used, to perform optical reading of a reading target in a duplicator such as a facsimile, a copier, and a scanner, in a financial terminal such as a banknote identification device, in an inspection device such as a substrate inspection device, and the like. Such image reading devices sometimes include a plurality of lenses arranged along a longitudinal direction (refer to, for example, Patent Literatures 1-7). Patent Literatures 1-7 disclose a rod lens array including a plurality of rod lenses that are reduction optics serving as focusing optics and are arranged along a longitudinal direction. Further, the image reading devices sometimes employ a micro lens array including a plurality of micro lenses that are reduction optics and are arranged along a longitudinal direction.

Such image reading devices that employ a lens body of a plurality of lenses arranged along a longitudinal direction, due to size of a reading target, sometimes need to be further elongated in the longitudinal direction. In this case, the lens body also needs to be elongated. As obtaining single lens body extending over the entire reading width of the image reading device is difficult in terms of manufacturing, the lens body is elongated by bonding a plurality of short lens bodies to each other (refer to, for example, Patent Literatures 3-7).

CITATION LIST

Patent Literature

Patent Literature 1: Unexamined Japanese Patent Application Publication No. 2016-197810
Patent Literature 2: International Publication No. WO 2014/148237
Patent Literature 3: Unexamined Japanese Patent Application Publication No. 2013-168925
Patent Literature 4: International Publication No. WO 2010/106656
Patent Literature 5: Unexamined Japanese Patent Application Publication No. 2010-187187
Patent Literature 6: Unexamined Japanese Patent Application Publication No. 2005-217630
Patent Literature 7: Unexamined Japanese Patent Application Publication No. H11-41410

SUMMARY OF INVENTION

Technical Problem

Patent Literature 3 discloses a structure having two types of frames and in which a first adhesive with high viscosity and long curing time is applied over the entire length of one of the frames and then a second adhesive with short curing time, such as a photosetting adhesive, is applied to application grooves that are disposed in the one frame to which the first adhesive is applied in narrow ranges at regular intervals. However, this structure does not include position adjustment mechanisms at ends of the lenses and the lenses are simply pressed against a pressing surface disposed in the frame, causing a problem in that applying this structure to lenses with a long conjugate length is difficult. Further, problems occur such as the expenditure of man-hours due to the need for the first adhesive to be applied to all of the application grooves disposed in the frame, and when warpage of the frame is large, separation occurring between the lens and the applied adhesive.

Furthermore, according to the structure disclosed in Patent Literature 3, the second adhesive is used to perform temporary fixing onto the frame because the first adhesive has long curing time. The first adhesive has high viscosity and remains flexible even after curing, and thus the first adhesive enables absorption of a difference in linear expansion between the frame and the lenses due to a change in temperature. However, the second adhesive that is applied to the application grooves disposed over the entire length of the frame at regular narrow intervals is rigid, and thus expansion or contraction of the frame may possibly affect junctions at which two lenses are connected to each other.

Patent Literature 4 discloses a structure to cause retraction of burrs on a lens body. However, Patent Literature 4 does not disclose how to deal with a case of lenses with a long conjugate length.

Patent Literature 5 discloses a structure in which lenses are connected to achieve a long lens. In this structure, screws that each are provided at an end portion of lenses from a frame to fix one point serve as lens fixing means. However, although lenses with a long conjugate length need fine adjustments of inclinations thereof, this structure causes a problem in that correction of inclinations of the lenses cannot be achieved. Further, in this structure, the lenses, including portions at which the lenses are connected to each other, are entirely (wholly) sandwiched from both sides thereof by frames and bonded to the frames using double-faced adhesive tape. This causes a problem in that lengthening of the lenses leads to warpage of the frames and occurrence of a gap between the double-faced adhesive tape and the frames. Further, bonding the lenses to the frames during assembling requires moving of a sensor position in adjusting the conjugate length of the lenses after assembling and causes a problem in that the sensor position does not have sufficient dust-proofness.

Patent Literature 6 discloses a structure in which a position of a lens body is adjusted using a frame on a housing side. However, Patent Literature 6 does not disclose how to adjust junctions of lens bodies and also does not disclose how to deal with the case of long conjugate length of the lenses and variance in widths of rod lenses.

Patent Literature 7 discloses a structure in which lenses are coupled using spacer plates. However, Patent Literature 7 does not disclose how to deal with a case of lenses with a long conjugate length.

The present disclosure is made to solve the aforementioned problems and relates to a lens body bonding structure, an image reading device, and a lens body bonding method that enable easy adjustment of positions of a first lens body and a second lens body.

Solution to Problem

A lens body bonding structure and an image reading device according to the present disclosure include a lens body bonding structure at least including a first lens body of a plurality of lenses arranged linearly in a longitudinal direction and a second lens body of a plurality of lenses arranged linearly in the longitudinal direction and in which the first lens body and the second lens body are bonded to each other to align linearly along the longitudinal direction, the lens body bonding structure including:

- a lens fixing plate that supports, on a surface determined by intersection of a straight line in an optical axis direction of the first lens body and the second lens body and a straight line in the longitudinal direction, the first lens body and the second lens body;
- holes that are formed in the lens fixing plate in a lateral direction intersecting the optical axis direction and the longitudinal direction so as to sandwich, when viewed in the lateral direction, a junction of the first lens body and the second lens body such that at least one of the holes is provided for each of the first lens body and the second lens body;
- a lens fixing plate opening that is at least one opening formed in the lens fixing plate in the lateral direction, at a position sandwiched by the holes that are disposed so as to sandwich the junction such that at least one of the holes is provided for each of the first lens body and the second lens body;
- a first adjustment member that is inserted into the hole and contacts the first lens body;
- a second adjustment member that is inserted into the hole and contacts the second lens body; and
- a resin portion of resin filling a space between (i) the first lens body and the second lens body and (ii) the lens fixing plate opening.

A lens body bonding method according to the present disclosure is a lens body bonding method using at least a first lens body of a plurality of lenses arranged linearly in a longitudinal direction and a second lens body of a plurality of lenses arranged linearly in the longitudinal direction and in which the first lens body and the second lens body are bonded to each other to align linearly along the longitudinal direction, the lens body bonding method comprising:

- a lens body fixing step of fixing the first lens body and the second lens body to, using an adhesive layer, a surface of a lens fixing plate determined by intersection of a straight line in an optical axis direction of the first lens body and the second lens body and a straight line in the longitudinal direction, such that the lens fixing plate in which a lens fixing plate opening is formed in the lateral direction intersecting the optical axis direction and the longitudinal direction overlaps, when viewed in the lateral direction, at least a portion of a junction at which the first lens body and the second lens body are bonded to each other;
- a lens body adjustment step of adjusting positions of the first lens body and the second lens body by
   - bringing a first adjustment member into contact with the first lens body via at least one hole into which the first adjustment member is inserted, the at least one hole included in holes formed in the lens fixing plate in the lateral direction so as to sandwich, when viewed in the lateral direction, the junction such that at least one of the holes is provided for each of the first lens body and the second lens body,
   - bringing a second adjustment member into contact with the second lens body via at least one hole that is included in the holes and into which the second adjustment member is inserted, and
   - moving at least one of the first adjustment member or the second adjustment member forward or backward along the lateral direction; and
- a resin portion forming step of injecting resin through the lens fixing plate opening and filling with the resin a space between (i) the first lens body and the second lens body and (ii) the lens fixing plate opening.

Advantageous Effects of Invention

As described above, according to the present disclosure, a lens body bonding structure, an image reading device, and a lens body bonding method that enable adjustment of positions of the first lens body and the second lens body at a junction of the lens bodies can be obtained.

BRIEF DESCRIPTION OF DRAWINGS

FIG. 1 illustrates cross-sectional views of an image reading device according to Embodiments 1 and 2 of the present disclosure, that is, cross-sectional views as viewed in a longitudinal direction;

FIG. 3 illustrates processes of bonding to achieve a lens body bonding structure according to Embodiment 1 of the present disclosure;

DESCRIPTION OF EMBODIMENTS

Embodiment 1

Figure 2:
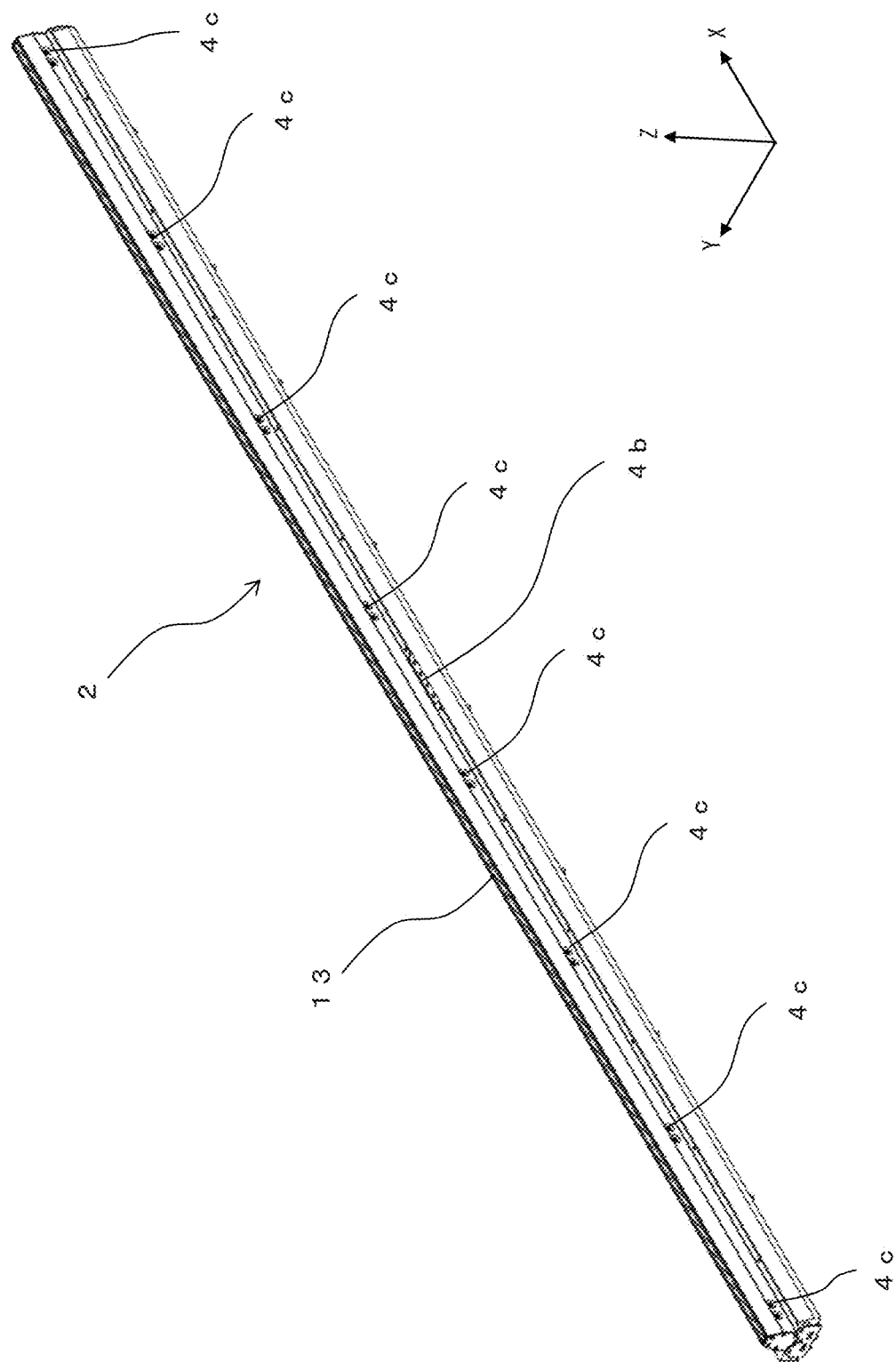
FIG. 2 is a perspective view of the image reading device according to Embodiments 1 and 2 of the present disclosure.

Hereinafter, Embodiment 1 of the present disclosure is described with reference to FIGS. 1-3. In the drawings, the same reference signs are assigned to the same or equivalent parts, and detailed description of such parts may be omitted. In a lens body bonding structure (a lens body structure 1) according to Embodiment 1, a direction in which the lens body bonding structure 1 extends is a longitudinal direction, and a direction that intersects this longitudinal direction is a lateral direction. The lens body bonding structure 1 includes a first lens body 1a and a second lens body 1b. The lens body bonding structure according to Embodiment 1 at least includes the first lens body 1a of a plurality of lenses that are reduction optics and are arranged linearly in the longitudinal direction and the second lens body 1b of a plurality of lenses that are reduction optics and are arranged linearly in the longitudinal direction and in which the first lens body 1a and the second lens body 1b are bonded to each other to align linearly along the longitudinal direction. Rod lenses and micro lenses are representative examples of the lenses that serve as reduction optics. In the present disclosure, an example is described in which rod lenses are used as the lenses that serve as reduction optics. Further, although the rod lenses illustrated in the drawings are arranged in a row along the longitudinal direction, the rod lenses may be arranged in multiple rows along the longitudinal direction.

A direction that is parallel to an optical axis of the lens body bonding structure 1 (the first lens body 1a and the second lens body 1b) is an optical axis direction. The optical axis direction, the longitudinal direction, and the lateral direction intersect one another, and preferably these directions are orthogonal to one another, that is, the angles of intersections thereof are 90 degrees. The lens body bonding structure according to Embodiment 1 and the image reading device according to Embodiment 1 have the relationship as below: the image reading device (an image reading device 2) according to Embodiment 1 includes the lens body bonding structure (the lens body bonding structure 1) and receives, that is, optically reads, reflected light or transmitted light from a reading target; more specifically, focuses and receives the reflected light or transmitted light from the reading target using the first lens body 1a and the second lens body 1b.

The reading target is also called a document and is a medium to be scanned (an object to be irradiated) that has image information (optical information) of, for example, a banknote, a securities certificate, or another common document. The image reading device, that is, the image reading device 2, according to Embodiment 1 further includes a sensor 3 and a housing 4. The sensor 3 includes a sensor array 3a for receiving light from the first lens body 1a and the second lens body 1b. The housing 4 supports the sensor 3 and the lens body bonding structure 1. The lens body bonding structure 1 may be simply referred to as the "lens body 1". The housing 4 supports a lens fixing plate 5 (a lens fixing board 5) and defines a space on a side opposite to the lens fixing plate 5 in the lateral direction. Specifically, the housing 4 supports the lens fixing plate 5 along a main scanning direction, that is, the longitudinal direction. The lens body bonding structure 1 is arranged to align with a projecting portion 5a of the lens fixing plate 5. The projecting portion 5a may extend in the longitudinal direction or may be formed intermittently in the longitudinal direction. The projecting portion 5a may be omitted as illustrated in the drawings for explanation of Embodiment 2 described later, such as FIG. 18.

The longitudinal direction, the lateral direction, and the optical axis direction of the lens body bonding structure according to Embodiment 1 correspond respectively to the main scanning direction, a sub-scanning direction, and an optical axis direction of the image reading device according to Embodiment 1. The optical axis direction of the image reading device 2 is a height direction of the image reading device 2. In the case where the image reading device 2 supports the lens body bonding structure 1 such that the height direction of the image reading device 2 and the optical axis direction of the lens body bonding structure 1 are parallel to each other, the optical axis direction of the image reading device 2 aligns with the optical axis direction of the lens body bonding structure 1. In this case, the optical axis direction of the lens body bonding structure 1 can be said to be the height direction of the lens body bonding structure 1. In the drawings of the present disclosure, the longitudinal direction (the main scanning direction) is illustrated as an X-axis direction, the lateral direction (the sub-scanning direction) is illustrated as a Y-axis direction, the optical axis direction (the height direction) is illustrated as a Z-axis direction, and an example in which the X-axis, the Y-axis, and the Z-axis are orthogonal to one another is illustrated.

In the case of configuration in which the image reading device 2 includes a reflecting mirror and reflected light or transmitted light from the reading target is focused by the first lens body 1a and the second lens body 1b after bending the optical axis of the reflected light or transmitted light using this reflecting mirror, an optical axis direction from the reading target to the reflecting mirror of the image reading device 2 and the optical axis direction of the lens body bonding structure 1 intersect but do not align with each other. That is to say, when each of the optical axis direction, the height direction, and the Z-axis direction is taken to be a reading depth direction, the reading depth direction of the image reading device 2 and the reading depth direction of the lens body bonding structure 1 align with each other regardless of arrangement of the lens body bonding structure 1 in the image reading device 2. A reading depth, that is, a reading distance, is a distance from the reading target for optical readability by the image reading device 2.

In the drawings of the present disclosure, a configuration is illustrated in which the height direction of the image reading device 2 and the optical axis direction of the lens body bonding structure 1 align with each other. The main scanning direction of the image reading device 2 is a scanning direction of the sensor array 3a extending in the main scanning direction, that is, in the longitudinal direction. The sub-scanning direction is a direction in which the reading target is conveyed. This "convey" means changing in a relative positional relationship between the reading target and the image reading device 2, and thus the reading target may move or the image reading device 2 itself may move.

In FIGS. 1-3, the lens fixing plate 5 supports, on a surface determined by intersection of a straight line in the optical axis direction of the first lens body 1a and the second lens body 1b and a straight line in the longitudinal direction, the first lens body 1a and the second lens body 1b. A lens fixing plate opening 6 is an opening formed in the lens fixing plate 5 in the lateral direction intersecting each of the optical axis direction and the longitudinal direction, thereby overlapping at least a portion of a junction of the first lens body 1a and the second lens body 1b when viewed in the lateral direction. Holes 7 are formed in the lens fixing plate 5 such that at least one hole 7 is disposed at each of the front and rear of the lens fixing plate opening 6 in the longitudinal direction.

In FIGS. 1-3, a first adjustment member 8 is inserted into the hole 7 and contacts the first lens body 1a, and a second adjustment member 9 is inserted into the hole 7 and contacts the second lens body 1b. The first lens body 1a is positioned by the first adjustment member 8, and the second lens body 1b is positioned by the second adjustment member 9. Although the first adjustment member 8 and the second adjustment member 9 are fixed to the holes 7 using an adhesive or the like, at least one of the first adjustment member 8 or the second adjustment member 9 is movable forward and backward along the lateral direction before being fixed. The forward movement and the backward movement adjust the positions of the first lens body 1a and the second lens body 1b. An anaerobic adhesive is preferable for the adhesive used for fixing of the first adjustment member 8 and the second adjustment member 9.

A socket set screw, such as a hollow set screw, a straight slot screw, and a hex socket set screw, be used as the first adjustment member 8 and the second adjustment member 9. In the case where the first adjustment member 8 is a socket set screw 8 and the second adjustment member 9 is a socket set screw 9, the holes 7 are screw holes. Insertion of the socket set screw 8 and the socket set screw 9 to which the anaerobic adhesive is applied into the holes 7 fixes the socket set screw 8 and the socket set screw 9. A resin portion 10 includes resin 11 filling a space between (i) the first lens body 1a and the second lens body 1b and (ii) in the lens fixing plate opening 6. Two or more each of the first adjustment member 8 and the second adjustment member 9 are preferably disposed along the optical axis direction. In this case, two or more of the holes 7 are formed at each of the front and rear of the lens fixing plate opening 6 in the longitudinal direction, that is to say, four or more of the holes 7 are formed in the lens fixing plate 5. In the drawings, a configuration is illustrated in which four of the holes 7 are formed and two each of the first adjustment member 8 and the second adjustment member 9 are disposed.

Further, as illustrated, a reinforcing plate 12 (a reinforcing board 12) is preferably further provided that supports, on a surface determined by intersection of a straight line in the optical axis direction and a straight line in the longitudinal direction, the junction of the first lens body 1a and the second lens body 1b. For example, employment of a metallic reinforcing plate 12 is conceivable. The reinforcing plate 12 is attached to a surface opposite to the lens fixing plate 5 to surround at least a portion of the surface at which the junction is disposed.

Specifically, the reinforcing plate 12 is arranged on a side opposite to the lens fixing plate 5 in the lateral direction, and the reinforcing plate 12 has a length in the longitudinal direction shorter than that of the lens fixing plate 5. The reinforcing plate 12 may further include, at a portion thereof facing in the lateral direction a position that includes at least a portion of the junction of the first lens body 1a and the second lens body 1b, a reinforcing plate recess 12a. The reinforcing plate recess 12a is a groove formed along the optical axis direction. Since the reinforcing plate 12 moves up and down for adjustment of the position of the lens body bonding structure 1, the likelihood of the position is to be considered. Further, in order to prevent transmission of unnecessary light, the lower end of the lenses is not to be located above the lower end of a reinforcing plate relief portion 4a of the housing 4.

The housing 4 supports the lens fixing plate 5 and defines a space with the reinforcing plate 12. Specifically, the housing 4 supports the lens fixing plate 5 along the main scanning direction, that is, along the longitudinal direction. Similarly, the housing 4 defines a space with the reinforcing plate 12 along the main scanning direction, that is, along the longitudinal direction. Since the reinforcing plate 12 is formed surrounding the junction of the first lens body 1a and the second lens body 1b, the space between housing 4 and lens body bonding structure 1 at the reinforcing plate 12 side may be provided such that a portion thereof at which the reinforcing plate 12 is located is wider than portions other than the portion to avoid contact with the reinforcing plate 12, or may have the same width throughout the main scanning direction (the longitudinal direction).

Thus, the lens body bonding structure and the image reading device according to Embodiment 1 have cross-sectional shapes as illustrated in section A and section B of FIG. 1 that each are a view of a cross-section taken along the Y-axis and the Z-axis. In other words, these are cross-sectional views as viewed in the longitudinal direction. FIG. 1 illustrates, in section A and section B, cross-sectional views taken at portions at which the reinforcing plate 12 is located. Particularly, the cross-sectional view in section A of FIG. 1 is also a cross-sectional view taken at a portion at which the holes 7 are located. Although the first adjustment members 8 is illustrated in section A of FIG. 1, this may be a view of a cross section shifted along the X-axis direction and illustrating the second adjustment members 9. FIG. 2 is a perspective view of the image reading device according to Embodiment 1. As illustrated in FIG. 2, the image reading device according to Embodiment 1 has an extreme long length in the longitudinal direction, that is, the X-axis direction, as compared with the lengths thereof in the other directions, and thus can be said to be "elongated". The image reading device 2 includes internally the lens body bonding structure 1, that is, the lens body 1. Although the lens body structure 1, that is, the lens body 1, is described above as a bonding structure obtained by bonding two lens bodies of the first lens body 1a and the second lens body 1b to each other, a plurality of the bonding structures may be formed to elongate the image reading device 2 (the lens body structure 1).

The image reading device 2 illustrated in FIG. 1 is described in more detail. A transparent body 13 is fitted in the housing 4 on an optical path through which light from the reading target of the image reading device 2 passes. The transparent body 13 is a rectangular transparent plate extending in the longitudinal direction, that is, the X-axis direction, and is made of, for example, a transparent resin or glass. This "transparent" means having transparency of light of a wavelength used by the image reading device 2 to perform optical reading and does not mean having transparency only for visible light. The transparent body 13 is arranged between (i) the reading target and (ii) the first lens body 1a and the second lens body 1b. The transparent body 13 may be omitted.

Rod lenses arranged in an array in the longitudinal direction as described above, that is, a rod lens array 1 including a first rod lens array 1a and a second rod lens array 1b that are focusing optics, may be used as the first lens body 1a and the second lens body 1b. The rod lens array 1 is arranged between the reading target and the sensor 3. In the present disclosure, the first rod lens array 1a and the second rod lens array 1b are, using a sheet-like adhesive sheet member such as double-faced adhesive tape, held by the lens fixing plate 5. The sheet-like adhesive sheet member may be an adhesive. That is to say, any sheet member and adhesive that can form a membrane-like adhesive layer after curing may be used.

This is the rod lens array 1, that is, the lens body bonding structure according to Embodiment 1. The first rod lens array 1a and the second rod lens array 1b are bonded to each other by the resin portion 10 that is formed by filling with the resin 11 from the lens fixing plate opening 6 formed in the lens fixing plate 5. The first lens body 1a and the second lens body 1b that serve as the rod lens array 1 are sandwiched by holding plates extending in the longitudinal direction. The image reading device 2 is obtained by fixing to the housing 4 the lens fixing plate 5 to which the rod lens array 1 is attached. This can alternatively be said to be inserting into the housing 4 the lens body bonding structure 1 after bonding, that is, after being processed.

This is the relationship between the image reading device according to Embodiment 1 and the lens body bonding structure according to Embodiment 1. A fastener member such as a screw is used to fix the lens fixing plate 5 to the housing 4. To fix the lenses, screws for fixing the lens body bonding structure 1 to the housing 4 are passed through tap holes 19 illustrated in section A of FIG. 3 that are disposed in the lens fixing plate 5 and through housing screw holes 4c of the housing 4 illustrated in FIG. 2. FIG. 3 illustrates, in section A, a side view of the lens body bonding structure 1 as viewed in the lateral direction. FIG. 3 illustrates, in section B, a side view of the first lens body 1a as viewed in the longitudinal direction of the lens body bonding structure 1. As illustrated in section B of FIG. 3, similarly to FIG. 1, the first lens body 1a (the lens body bonding structure 1) is arranged to align with the projecting portion 5a of the lens fixing plate 5. In order to enable correction of variance in a conjugate length of the lens body bonding structure 1, positions of the lens fixing plate 5 and the lens body bonding structure 1 with respect to the housing 4 are variable. The junction may be located at the midpoint between the tap holes 19.

As illustrated in FIG. 1, the reinforcing plate 12 is attached to a surface of the rod lens array 1 opposite to the surface that is attached to the lens fixing plate 5 in the lateral direction, that is, the Y-axis direction. Specifically, the first rod lens array 1a and the second rod lens array 1b are, using an adhesive layer that is membrane-like after curing, held by the reinforcing plate 12. The adhesive may be a sheet-like adhesive sheet member. That is to say, any sheet member or adhesive that can form a membrane-like adhesive layer after curing may be employed. Thus, the lens body bonding structure can be said to include a sheet-like sheet member that is an adhesive or an adhesive layer at at least one of a portion between (i) the first lens body 1a and the second lens body 1b and (ii) the lens fixing plate 5 or a portion between (i) the first lens body 1a and the second lens body 1b and (ii) the reinforcing plate 12. The adhesive layer that is membrane-like after curing is described later in detail, in the explanation of a lens body bonding method according to Embodiment 1.

In the present disclosure, a configuration is descried as an example in which the optical axis of the rod lens array 1 is perpendicular to a reading surface (the reading target) and the reflected light or transmitted light from the reading target is focused onto the sensor 3, that is, the sensor array 3a. Further, a light source (an illumination device) that irradiates light onto the reading target may be included in the image reading device, although explanation of which is omitted. The sensor 3, that is, the sensor array 3a, receives light focused by the rod lens array 1, performs photoelectric conversion, and outputs an electrical signal. On the sensor 3, that is, the sensor array 3a, a receiver including a semiconductor chip or the like and another drive circuit or the like are mounted.

The sensor 3, that is, the sensor array 3a, is fixed to the sensor board 14 using an adhesive. The sensor board 14 is fixed to a board support plate 16 together with a board 15 having a function different from that of the sensor board 14. The sensor board 14 and the board 15 are fixed using, for example, an adhesive, a tape, or a screw. The housing 4, which is arranged between the rod lens array 1 and the board support plate 16 to which the sensor board 14 and the board 15 are attached, blocks light entry from the exterior of the image reading device 2 into the sensor 3 and also has a dustproof effect of preventing entry of dust or the like into the sensor 3.

Figure 10:
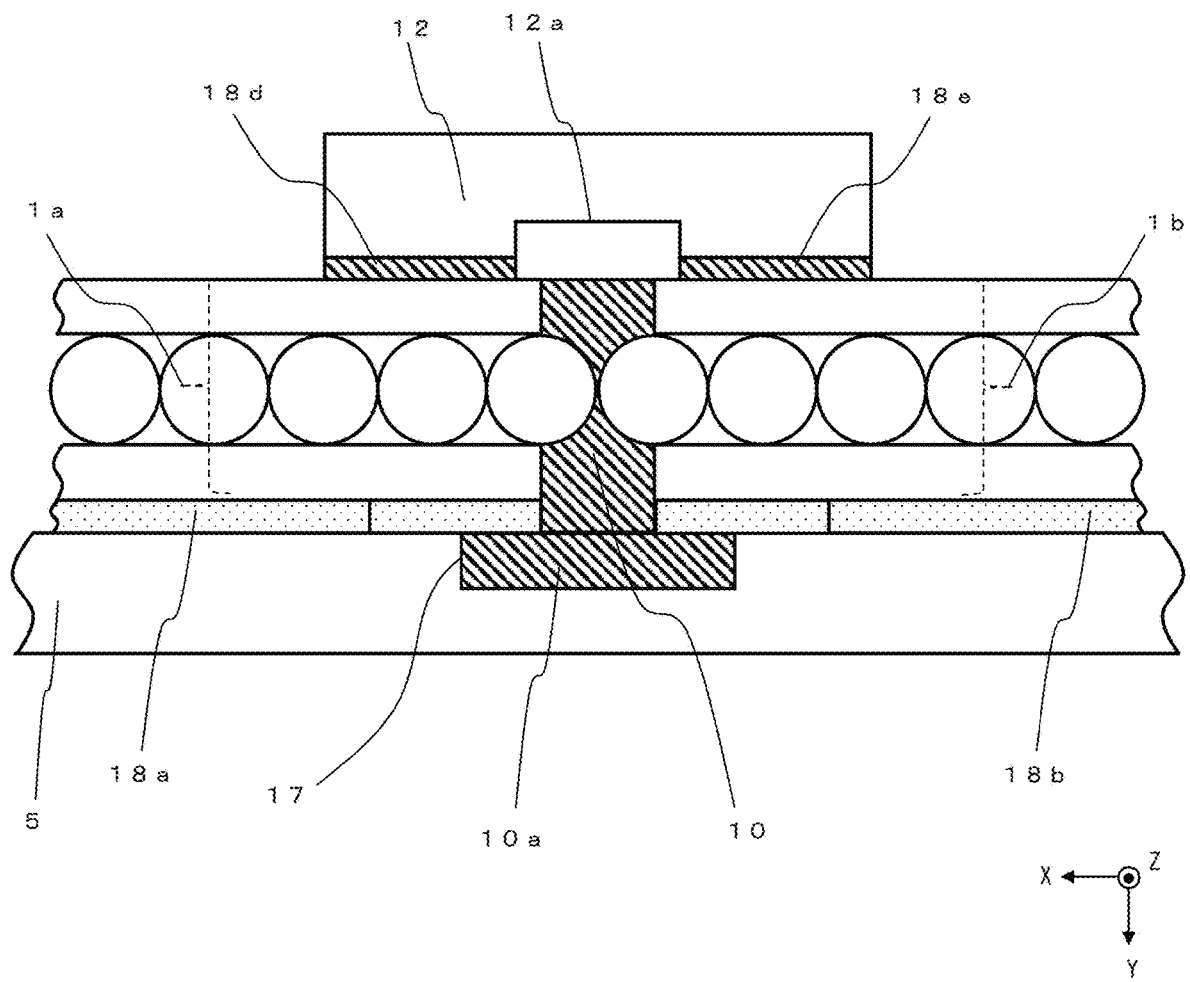
FIG. 10 is a top view of the lens body bonding structure according to Embodiment 1 of the present disclosure.

Here, although reducing accuracy in adjustment of usage amount of resin 11 to be used for bonding the first rod lens array 1a and the second rod lens array 1b to each other increases productivity, an insufficient amount of the resin 11 may hinder bonding between the first rod lens array 1a and the second rod lens array 1b. Thus, as illustrated in FIG. 10 described later, the lens fixing plate 5 may further include a hollow 17 on a surface thereof determined by intersection of a straight line in the longitudinal direction and a straight line in the lateral direction, at at least a portion close to the first rod lens array 1a and the second rod lens array 1b.

This hollow 17 can store excess of the resin 11, thereby providing leeway in the accuracy in adjustment of the usage amount of the resin 11. Thus, a second resin portion 10a that is continuous with the resin portion 10 is formed in at least a portion of the hollow 17. That is to say, a preferable lens body bonding structure (image reading device) according to Embodiment 1 includes, at a portion of the lens fixing plate 5 at which the first lens body 1a and the second lens body 1b are bonded to each other, one lens fixing plate opening 6, four of the holes 7, and one hollow 17.

The image reading device according to Embodiment 1 includes a housing holder 4b for fixing the image reading device 2 to a device that houses the image reading device 2, for example, to a duplicator such as a facsimile, a copier, and a scanner, to a financial terminal such as a banknote identification device, and to an inspection device such as a substrate inspection device. At least a portion of the housing holder 4b aligns with the junction of the first lens body 1a and the second lens body 1b in the lens body bonding structure 1 in the longitudinal direction, and this produces the effects below. Alignment of a node of vibration with the junction, upon application of the vibration to the image reading device 2 or the device that houses the image reading device 2, causes relaxation of stress at the junction and improves vibration tolerance. Further, arranging the junction of the lens body bonding structure 1 at the midpoint in the longitudinal direction between the screws (screw holes) for fixing the lens body bonding structure 1 (the lens body 1) to the housing 4 enables relaxation of shear stress applied on the junction after adjustment of the position of the lens and stabilizes optical performance.

Figure 4:
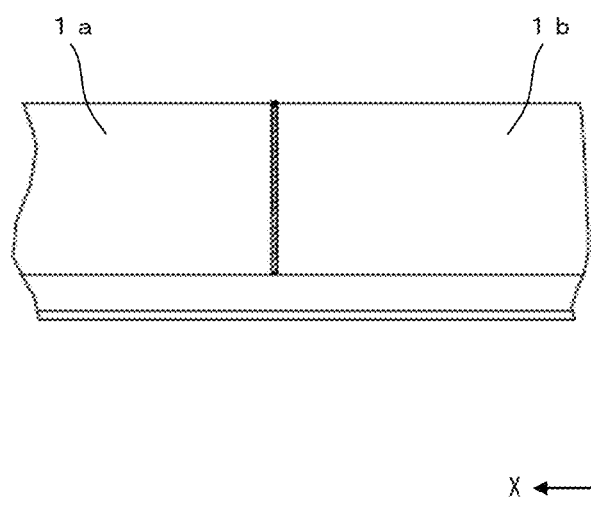
FIG. 4 illustrates a process of the bonding to achieve the lens body bonding structure according to Embodiment 1 of the present disclosure.

Hereinafter, a lens body bonding method according to Embodiment 1 is explained with reference to FIGS. 4-10. In the drawings, the same or equivalent components are denoted by the same reference signs, and detailed explanation thereof may be omitted. The lens body bonding method according to Embodiment 1 is a method for obtaining the lens body bonding structure according to Embodiment 1. The lens body bonding method according to Embodiment 1 is a method for, using at least the first lens body 1*a* of a plurality of lenses that are reduction optics and are arranged linearly in the longitudinal direction and the second lens body 1*b* of a plurality of lenses that are reduction optics and are arranged linearly in the longitudinal direction, bonding the first lens body 1*a* and the second lens body 1*b* to each other linearly along the longitudinal direction, as illustrated in FIG. 4. The lens body bonding method according to Embodiment 1 includes a lens body fixing step, a lens body adjustment step, and a resin portion forming step, and may further include a lens body reinforcing step, an adjustment member fixing step, and attachment step.

The lens body fixing step is a step of fixing the first lens body 1*a* and the second lens body 1*b* to, using sheet-like adhesive sheet members 18*a*, 18*b*, and 18*c*, the surface of the lens fixing plate 5 determined by intersection of the straight line in the optical axis direction of the first lens body 1*a* and the second lens body 1*b* and the straight line in the longitudinal direction, such that the lens fixing plate opening 6 formed in the lens fixing plate 5 in the lateral direction intersecting the optical axis direction and the longitudinal direction overlaps, when viewed in the lateral direction, at least a portion of a junction at which the first lens body 1*a* and the second lens body 1*b* are bonded to each other. A sheet member 18, that is, each of the sheet member 18*a*, the sheet member 18*b*, and sheet member 18*c*, is preferably double-faced adhesive tape or the like. The sheet member 18 (the sheet member 18*a*, the sheet member 18*b*, and sheet member 18*c*) may be an adhesive 18 (an adhesive 18*a*, an adhesive 18*b*, and an adhesive 18*c*). That is to say, the sheet member 18 and the adhesive 18 may be any adhesive that can form a membrane-like adhesive layer 18 after curing, that is, an adhesive layer 18*a*, an adhesive layer 18*b*, and an adhesive layer 18*c*.

The lens body adjustment step is a step of adjusting positions of the first lens body 1*a* and the second lens body 1*b* by, by using the holes 7 that are formed in the lens fixing plate 5 at the front and rear of the lens fixing plate opening 6 in the longitudinal direction, bringing the first adjustment member 8 into contact with the first lens body 1*a* via at least one hole 7 into which the first adjustment member 8 is inserted, bringing the second adjustment member 9 into contact with the second lens body 1*b* via at least one hole 7 into which the second adjustment member 9 is inserted, and moving at least one of the first adjustment member 8 or the second adjustment member 9 forward or backward along the lateral direction. The resin portion forming step is a step of injecting the resin 11 through the lens fixing plate opening 6 and filling with the resin 11 a space between (i) the first lens body 1*a* and the second lens body 1*b* and (ii) the lens fixing plate opening 6.

Although reducing accuracy in adjustment of usage amount of the resin 11 to be used for bonding the first rod lens array 1*a* and the second rod lens array 1*b* to each other in the resin portion forming step can increase productivity, an insufficient amount of the resin 11 may hinder bonding between the first rod lens array 1*a* and the second rod lens array 1*b*. In this case, in the resin portion forming step, excess of the resin 11 injected through the lens fixing plate opening 6 may be stored in the hollow 17 that is formed in the lens fixing plate 5 on a surface determined by intersection of a straight line in the longitudinal direction and a straight line in the lateral direction, at at least a portion close to the first lens body 1*a* and the second lens body 1*b*.

Further, the adjustment member fixing step may be further included. The adjustment member fixing step is a step of fixing, after at least the lens body adjustment step, the first adjustment member 8 and the second adjustment member 9 to the holes 7.

Preferably, in the lens body adjustment step, adjustment of the positions of the first lens body 1*a* and the second lens body 1*b* is performed by using two or more each of the first adjustment member 8 disposed along the optical axis direction and the second adjustment member 9 disposed along the optical axis direction. In FIG. 3 described above, two or more of the hole 7 are formed at each of the front and rear of the lens fixing plate opening 6 in the longitudinal direction, that is to say, four or more of the holes 7 are disposed in the lens fixing plate 5. In the drawings, a configuration is illustrated in which four of the holes 7 are formed and two each of the first adjustment member 8 and the second adjustment member 9 are disposed.

Preferably, the lens body reinforcing step that is a step of fixing, using an adhesive 18*d* and an adhesive 18*e*, to the reinforcing plate 12 the junction at which the first lens body 1*a* and the second lens body 1*b* are bonded to each other, on the surface determined by intersection of a straight line in the optical axis direction and a straight line in the longitudinal direction, may be further included. The adhesive 18, such as the adhesive 18*d* and the adhesive 18*e*, is preferably be a two-part curing adhesive 18*d* and a two-part curing adhesive 18*e*. The lens body reinforcing step is a step of disposing the reinforcing plate 12 at a position opposite to the lens fixing plate 5 in the lateral direction and fixing the junction at which the first lens body 1*a* and the second lens body 1*b* are bonded to each other. Further, the reinforcing plate 12 used in the lens body reinforcing step may include, at a portion thereof facing in the lateral direction a position that includes at least a portion of the junction at which the first lens body 1*a* and the second lens body 1*b* are bonded to each other, the reinforcing plate recess 12*a* that is a groove formed along the optical axis direction.

Figure 5:
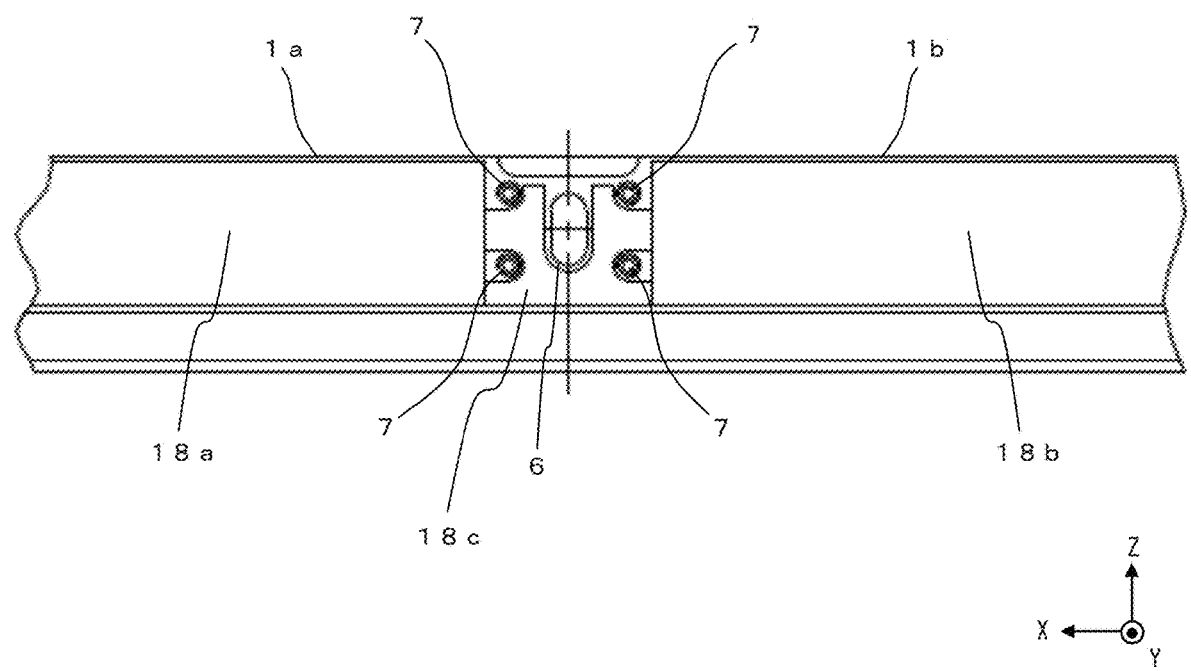
FIG. 5 illustrates a process of the bonding to achieve the lens body bonding structure according to Embodiment 1 of the present disclosure.
Figure 6:
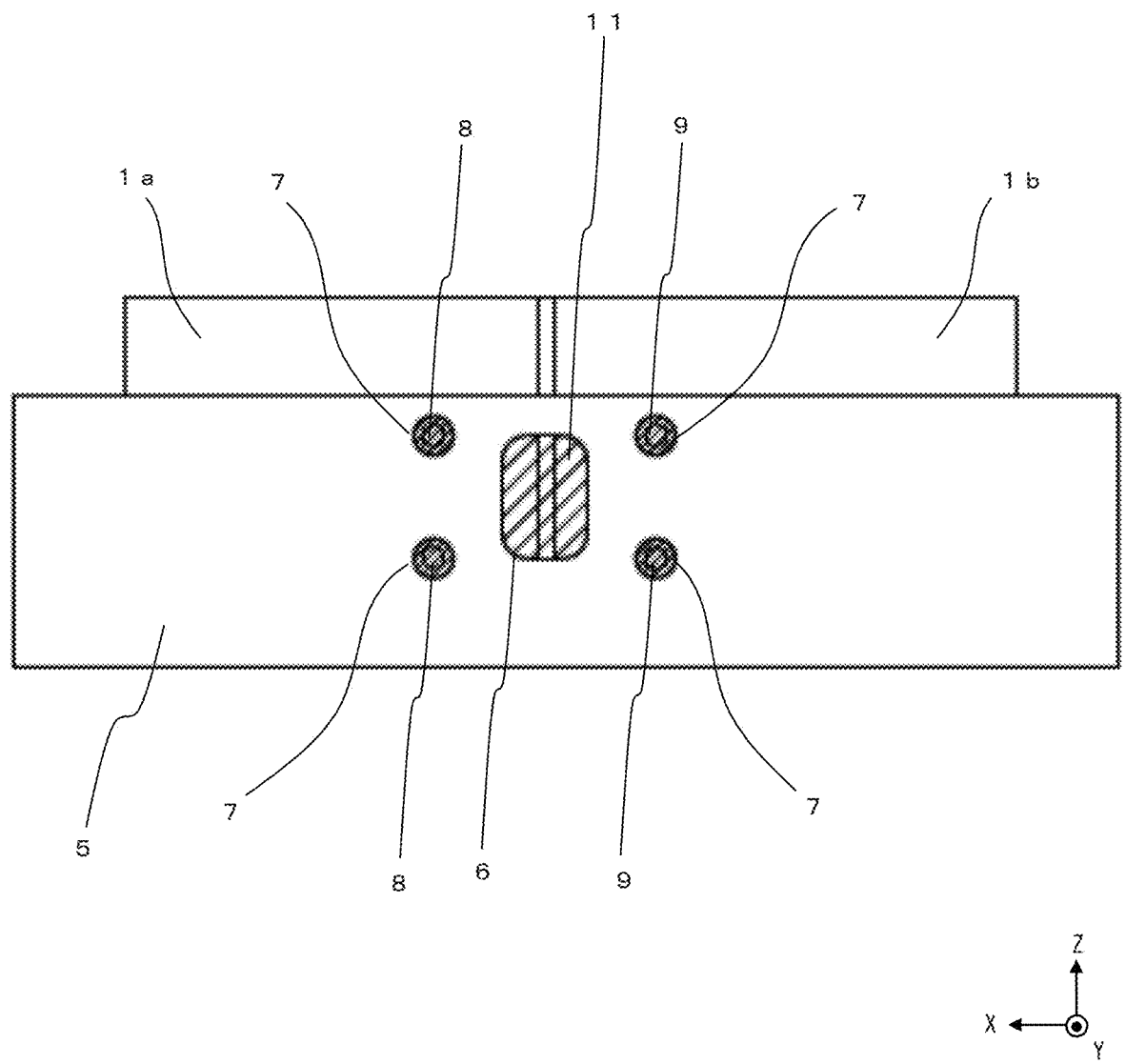
FIG. 6 is a side view of the lens body bonding structure according to Embodiment 1 of the present disclosure.

Here, the lens body fixing step and the lens body reinforcing step are explained in more detail with reference to FIG. 5. First, the lens body fixing step is explained. The lens body bonding structure 1 is arranged to align with, and attach to, the projecting portion 5*a* of the lens fixing plate 5. This attachment is performed using the sheet member 18, that is, the adhesive 18 and the adhesive layer 18. For the junction of the first lens body 1*a* and the second lens body 1*b* in which holes such as the lens fixing plate opening 6 and the holes 7 are formed, the sheet member 18*c* that avoids the holes is prepared in advance and is attached to the junction, as illustrated in FIG. 5. In the case of using the adhesive 18, the adhesive is applied while avoiding application to the holes such as the lens fixing plate opening 6 and the holes 7. Thereafter, the stripe-shaped sheet member 18*a* and sheet member 18*b* are each attached to from an end of the sheet member 18*c* to an end of the lens fixing plate 5. FIG. 6 illustrates a state after attachment of the lens fixing plate 5, in which the resin portion 10 is formed after completion of the resin portion forming step.

Figure 7:
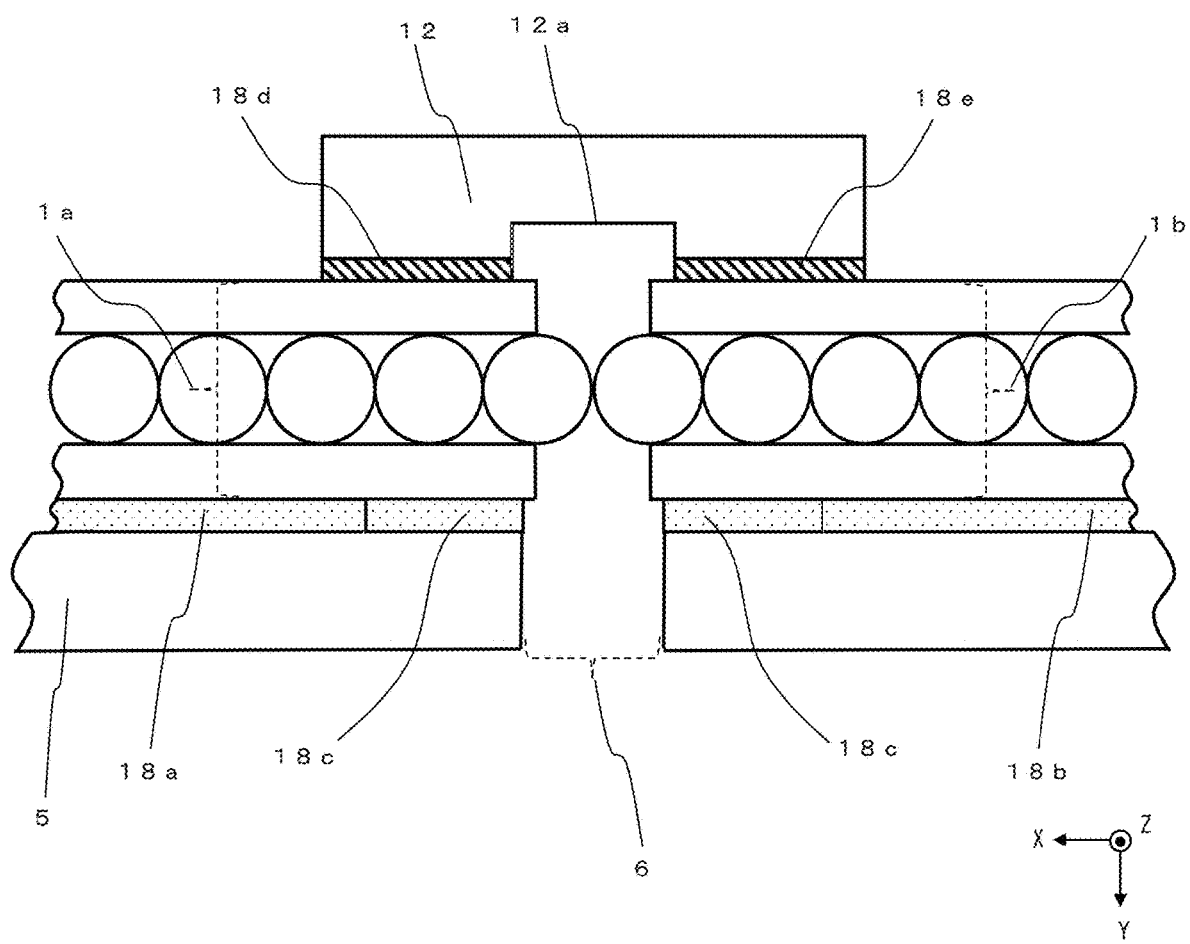
FIG. 7 is a cross-sectional view of the lens body bonding structure according to Embodiment 1 of the present disclosure before being filled with resin.

Next, the lens body reinforcing step is explained. As illustrated in FIG. 7 described later, the reinforcing plate 12 is attached to the first lens body 1*a* using the adhesive 18*d* and to the second lens body 1*b* using the adhesive 18*e*. This improves strength against a load applied to the junction due to tilting and shifting. The adhesive 18*d* and the adhesive 18*e* are preferably a two-part curing adhesive 18*d* and a two-part curing adhesive 18*e*. The sheet-like adhesive sheet members 18*d*, 18*e* may be used for this attachment instead of the two-part curing adhesive 18d and the two-part curing adhesive 18e. As the two-part curing adhesive 18d and the two-part curing adhesive 18e form thin and layered (membrane-like) adhesive layers 18d and 18e after curing, the two-part curing adhesive 18d (the adhesive 18d) and the two-part curing adhesive 18e (the adhesive 18e) may be also termed the sheet-like adhesive sheet members 18d, 18e. For the resin 11 that is an adhesive for bonding the first lens body 1a and the second lens body 1b to each other, the reinforcing plate recess 12a having a concave-shaped escaping structure is disposed in the reinforcing plate 12 to enable easy adhesion of the resin 11 to the first lens body 1a and the second lens body 1b. In view of enablement of formation of a step between the first lens body 1a and the second lens body 1b, a structure obtained by modifying the height of the adhesive surface of the first lens body 1a and the second lens body 1b may be employed.

The reinforcing plate 12 is preferably made of a material having low linear expansion, that is, made of a ferrous material. To reduce the effect of linear expansion, attachment only in the vicinity of the junction is preferable, without attaching the reinforcing plate 12 over the entire length of the lens body bonding structure 1 in the longitudinal direction. Attachment of the reinforcing plate 12 over the entire length in the longitudinal direction leads to strong bonding over the entire length, resulting in application of a force to the junction due to expansion and contraction of the reinforcing plate 12. Further, a long length of the reinforcing plate 12 causes difficulty in controlling warpage of the reinforcing plate 12, resulting in occurrence of a gap between the lens body bonding structure 1 and the reinforcing plate 12.

Figure 8:
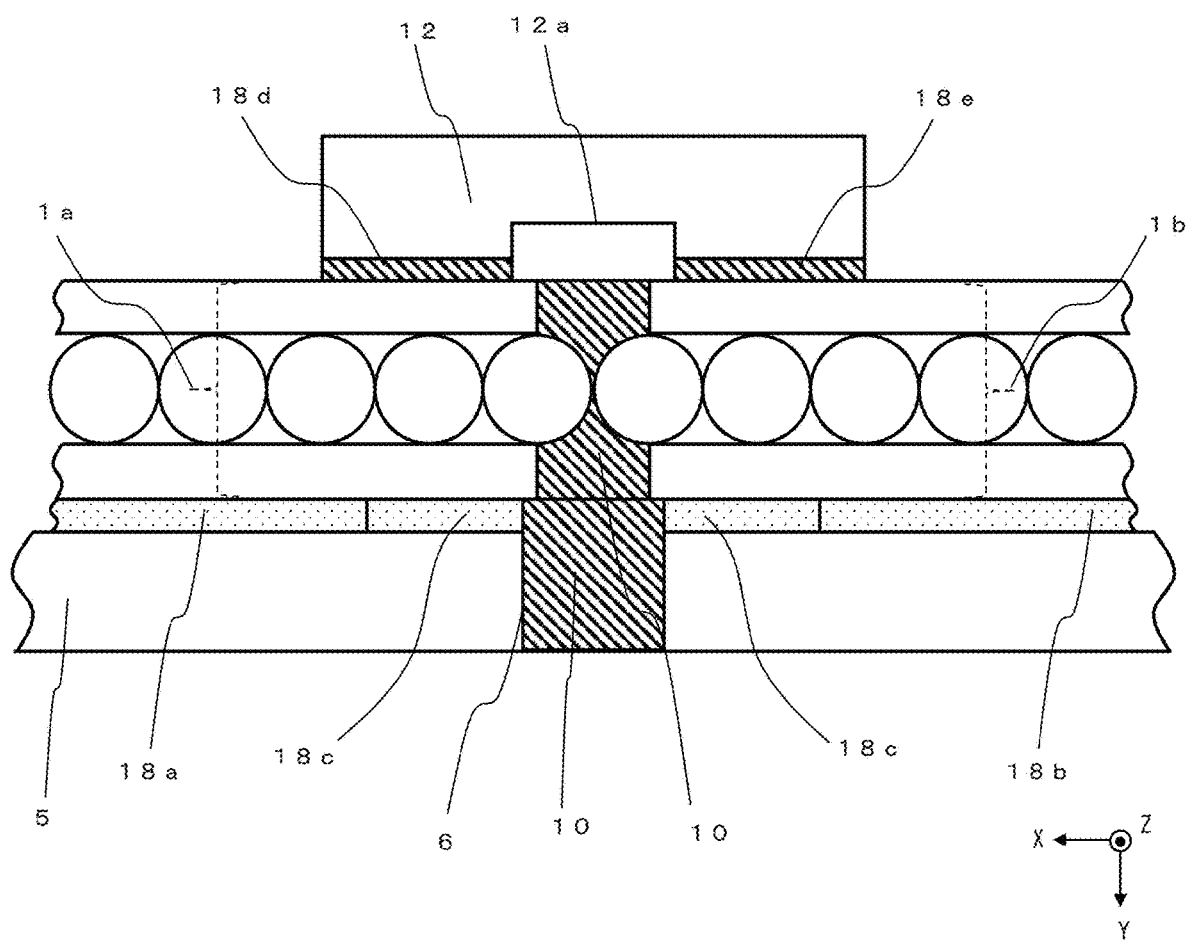
FIG. 8 is a cross-sectional view of the lens body bonding structure according to Embodiment 1 of the present disclosure.
Figure 9:
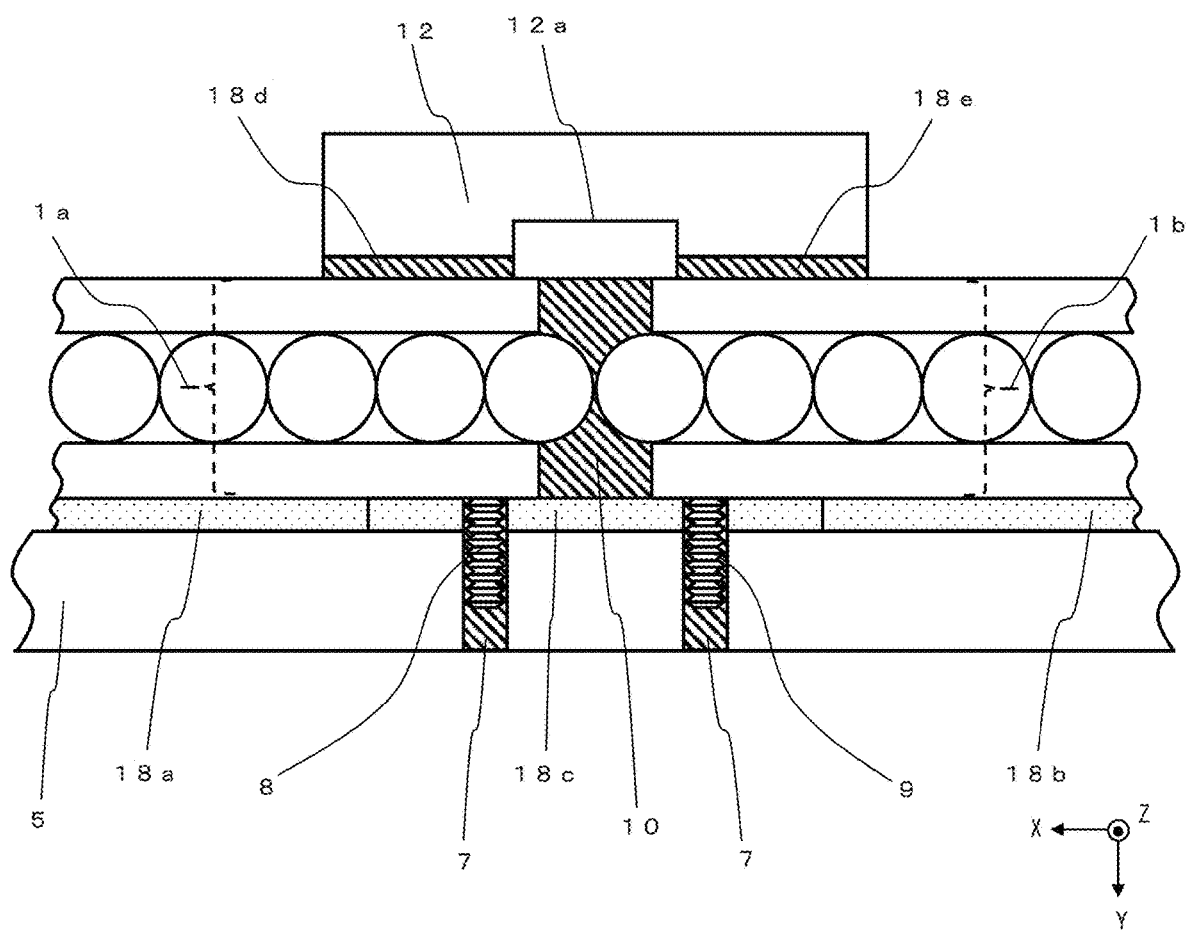
FIG. 9 is a cross-sectional view of the lens body bonding structure according to Embodiment 1 of the present disclosure.

The lens body adjustment step is explained in more detail with reference to FIGS. 7-10. Each of FIGS. 7 and 8 is a cross-sectional view taken at a plane that passes through the lens fixing plate opening 6 and on which the X-axis and the Y-axis intersect. FIG. 7 illustrates a state before formation of the resin portion 10, whereas FIG. 8 illustrates a state after formation of the resin portion 10. FIG. 9 is a cross-sectional view taken at a plane that passes through the holes 7 and on which the X-axis and the Y-axis intersect. FIG. 9 illustrates a state in which the first adjustment member 8 (the socket set screw 8) is inserted into the hole at the first lens body 1a side and the second adjustment member 9 (the socket set screw 9) is inserted into the hole at the second lens body 1b side.

FIG. 10 is a top view of a plane on which the X-axis and the Y-axis intersect. After the attachment of the lens body bonding structure 1 to the lens fixing plate 5, the socket set screws 8 and the socket set screws 9 to which the anaerobic adhesive is applied are attached to two of the holes 7 that are disposed in the lens fixing plate 5 along the optical axis direction to face an end portion of the first lens body 1a and an end portion of the second lens body 1b, that is, are attached to four of the holes 7. The positions of the first lens body 1a and the second lens body 1b are adjusted, by using the socket set screws 8 and the socket set screws 9, to align images of the lenses at the portion where the first lens body 1a and the second lens body 1b contact each other. The socket set screws 8 (the first adjustment members 8) (i) contact an end portion of the holding plate extending in the longitudinal direction and holding the first lens body 1a, more specifically, an end portion of the holding plate on a side from which the first lens body 1a is exposed (protrudes) and (ii) adjust the position of the first lens body 1a. The "end portion of the holding plate on a side from which the first lens body 1a is exposed (protrudes)" is an end portion on a side to be bonded to the second lens body 1b, that is, a side facing the second lens body 1b. The socket set screws 9 (the second adjustment members 9) (i) contact an end portion of the holding plate extending in the longitudinal direction and holding the second lens body 1b, more specifically, an end portion of the holding plate on a side from which the second lens body 1b is exposed (protrudes) and (ii) adjust the position of the second lens body 1b. The "end portion of the holding plate on a side from which the second lens body 1b is exposed (protrudes)" is an end portion on a side to be bonded to the first lens body 1a, that is, a side facing the first lens body 1a.

Upon completion of this adjustment, the resin portion forming step is performed. First, fixing of the first lens body 1a and the second lens body 1b is performed by filling, from the lens fixing plate opening 6 illustrated in FIG. 7, with the resin 11 that is a photosetting adhesive or a two-part curing adhesive (the resin 11 for temporary formation of the resin portion 10). After curing of the resin 11 that is a photosetting adhesive or a two-part curing adhesive, the images focused by the junction are checked again, and in the case of alignment of the images of the lenses, then the lens fixing plate 5 and the first lens body 1a and the second lens body 1b are firmly bonded to each other, which determines positional relationships therebetween. As a result, a configuration as illustrated in FIG. 8 is obtained that can prevent the occurrence of blurring of images and can release deformation caused by linear expansion to a part other than the junction of the lenses. This is because dispersion of stress, due to attachment using of the sheet member 18 such as double-faced adhesive tape, occurs due to slight deformation in most portions of the lenses other than the junction of the lenses.

The adjustment member fixing step is explained in more detail with reference to FIG. 9. In order to prevent unintended turning of the socket set screws 8 and the socket set screws 9, a photosetting adhesive or a two-part curing adhesive is applied to four of the holes 7. After curing of the photosetting adhesive or the two-part curing adhesive, a resin for preventing light transmission is applied to the junction of the first lens body 1a and the second lens body 1b. Since this resin need not have mechanical strength, a black silicone resin that does not transmit light or a resin similar thereto is preferable as this resin. Excess of the resin 11 is stored in the hollow 17 and serves as the second resin portion 10a, as illustrated in FIG. 10.

The lens body bonding structure 1, that is, the lens body 1, in the lens body bonding method according to Embodiment 1 may be the rod lens array 1, as described above. In the case of this configuration, each of the first lens body 1a and the second lens body 1b is the rod lens array 1 including a plurality of rod lenses arranged linearly and sandwiched by the holding plates extending in the longitudinal direction, and the lens body fixing step is a step of fixing the first lens body 1a and the second lens body 1b such that a rod lens included in the plurality of rod lenses and exposed from an end portion of the first lens body 1a in the longitudinal direction and a rod lens included in the plurality of rod lenses and exposed from an end portion of the second lens body 1b in the longitudinal direction face each other. In the case where each of the lens bodies includes rod lenses arranged in the longitudinal direction in multiple rows, each of rod lenses exposed from an end portion of the first lens body 1a in the longitudinal direction is aligned row by row with a corresponding rod lens exposed from an end portion of the second lens body 1b in the longitudinal direction. Further, in the case of the rod lens array 1, the resin portion forming step is a step of filling with the resin 11 a space between the rod lens exposed from the end portion of the first lens body 1a in the longitudinal direction and the rod lens exposed from the end portion of the second lens body 1b in the longitudinal direction.

The lens body bonding method according to Embodiment 1 may include, after curing of the resin 11 (the resin 11 for spatial formation of the resin portion 10) in the resin portion forming step, an attachment step of attaching the lens body bonding structure 1 to the housing 4. This method including the attachment step may be referred to as a method for manufacturing the image reading device according to Embodiment 1. The attachment step in the lens body bonding method (the method for manufacturing the image reading device) according to Embodiment 1 is a step of fixing the lens fixing plate 5 to the housing 4 using screws or the like. The screws for fixing the lens body bonding structure 1 to the housing 4 pass through the tap holes 19 illustrated in section A of FIG. 3 that are disposed in the lens fixing plate 5 and fix lenses, and the image reading device 2 is obtained. This can alternatively be said to be inserting into the housing 4 the lens body bonding structure 1 after bonding, that is, after being processed. As described above, in order to enable correction of variance in a conjugate length of the lens body bonding structure 1, positions of the lens fixing plate 5 and the lens body bonding structure 1 with respect to the housing 4 are variable. The junction may be located to the midpoint between the tap holes 19.

As described above, the attachment step in the lens body bonding method (the method for manufacturing the image reading device) according to Embodiment 1 is a step of inserting into the housing 4 the lens body bonding structure 1 after bonding, that is, after being processed. Since the reinforcing plate 12 can move up and down for adjustment of the position of the lens body bonding structure 1, the likelihood of the position is to be considered. Further, in order to prevent transmission of unnecessary light, the lower end of the lens is not to be located above the lower end of the reinforcing plate relief portion 4a of the housing 4. If light is transmitted, then attaching a resin plate or the like having the same width as that of the reinforcing plate 12 to a side surface of the lens body bonding structure 1 over the entire length thereof can prevent such transmission.

As described above, according to the lens body bonding structure, the image reading device, and the lens body bonding method (the method for manufacturing the image reading device) according to Embodiment 1, the alignment of images of lenses can be easily achieved merely by adjusting the lens body bonding structure 1 via adjustments of inclinations of the lenses of the first lens body 1a and the second lens body 1b by use of the first adjustment member 8 and the second adjustment member 9. Further, since mutual positional relationships between (i) the lenses of the first lens body 1a and the second lens body 1b and (ii) the lens fixing plate 5 are firmly fixed via an adhesive, various types of resistance to the environment of the lens body bonding structure 1 can be improved. According to the lens body bonding structure, the image reading device, and the lens body bonding method (the method for manufacturing the image reading device) according to Embodiment 1, fine adjustments of inclinations of lenses, which are needed in the case of bonding to each other the first lens body 1a and the second lens body 1b that include lenses with a long conjugate length, can be achieved. This configuration can deal with the phenomenon "when lenses with a long conjugate length are moved after adjustment and mutual positional relationships therebetween are changed, blurring of images occurs".

According to the lens body bonding structure, the image reading device, and the lens body bonding method (the method for manufacturing the image reading device) according to Embodiment 1, an adhesive for filling gaps with a high degree of difficulty in application need not be applied overall in the longitudinal direction (over the entire length). This makes processing performed in the overall longitudinal direction unnecessary.

Embodiment 2

Hereinafter, Embodiment 2 according to the present disclosure is described with reference to FIGS. 11-18. In Embodiment 1, the lens fixing plate opening 6 overlaps at least a portion of the junction of the first lens body 1a and the second lens body 1b when viewed in the lateral direction. Further, in Embodiment 1, the holes 7 are formed in the lens fixing plate 5 such that at least one hole 7 is disposed at each of the front and rear of the lens fixing plate opening 6 in the longitudinal direction. In Embodiment 2, the lens fixing plate opening 6 is disposed so as to align with the holes 7 along the optical axis direction when viewed in the lateral direction or disposed so as to be positioned on a side of the junction of the first lens body 1a and the second lens body 1b with respect to the holes 7 in the optical axis direction when viewed in the lateral direction. Further, in Embodiment 2, two of the holes 7 are disposed along the optical axis direction. In the drawings, the same reference signs are assigned to the same or equivalent parts, and detailed description of such parts may be omitted. Also, as relationships between the lens body bonding structure according to Embodiment 1 are the same as in Embodiment 1, basic explanation thereof is omitted.

Figure 11:
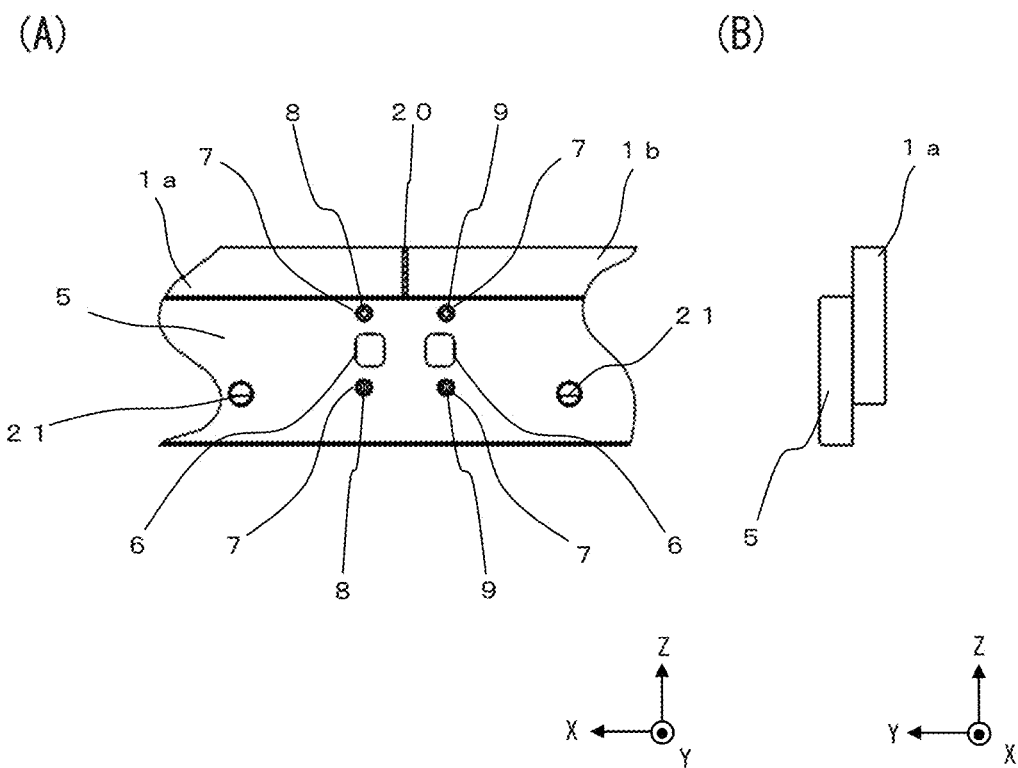
FIG. 11 illustrates processes of bonding to achieve a lens body bonding structure according to Embodiment 2 of the present disclosure.

Regarding a relationship between an image reading device according to Embodiment 2 and a lens body bonding structure according to Embodiment 2, detailed description of the image reading device according to Embodiment 1 and configuration that is similar to that of Embodiment 1 may be omitted. FIG. 11 illustrates, in section A, a side view of the lens body bonding structure 1 as viewed in the lateral direction. FIG. 11 illustrates, in section B, a side view of the first lens body 1a as viewed in the longitudinal direction of the lens body bonding structure 1. As illustrated in section B of FIG. 11, similarly to FIG. 1, the first lens body 1a (the lens body bonding structure 1) is arranged to contact the lens fixing plate 5. The junction may be located at the midpoint between the tap holes 19. The tap holes 19 disposed in the lens fixing plate 5 are not illustrated in section A of FIG. 11.

In the lens body bonding structure according to Embodiment 2, the lens fixing plate opening 6 overlaps a portion of the first lens body 1a and a portion of the second lens body 1b when viewed in the lateral direction. Further, the lens fixing plate opening 6 may be disposed so as to overlap the junction of the first lens body 1a and the second lens body 1b when viewed in the lateral direction, or may be disposed separately from the end portion of the first lens body 1a and the end portion of the second lens body 1b as illustrated in FIG. 11. That is to say, the lens fixing plate opening 6 according to the present disclosure can be said to be disposed at a position in the vicinity of the junction of the first lens body 1a and the second lens body 1b and to open in the lateral direction.

Hereinafter, a lens body bonding method according to Embodiment 2 is explained with reference to FIGS. 12-17. In Embodiment 1, the lens body fixing step is a step of fixing the first lens body 1a and the second lens body 1b to, using an adhesive layer, the surface of the lens fixing plate 5 determined by intersection of the straight line in the optical axis direction and the straight line in the longitudinal direction, such that the lens fixing plate opening 6 overlaps, when viewed in the lateral direction, at least a portion of the junction at which the first lens body 1a and the second lens body 1b are bonded to each other.

In Embodiment 2, the lens body fixing step is a step of fixing the first lens body 1a and the second lens body 1b to, using the adhesive layer, the surface of the lens fixing plate 5 determined by intersection of the straight line in the optical axis direction and the straight line in the longitudinal direction, such that the lens fixing plate opening 6 is misaligned, when viewed in the lateral direction, with the junction at which the first lens body 1a and the second lens body 1b are bonded to each other. Explanation of steps that are similar to those of Embodiment 1 may be omitted. The lens body bonding method according to Embodiment 2 includes the lens body fixing step, the lens body adjustment step, and the resin portion forming step, and may further include the lens body reinforcing step, the adjustment member fixing step, and the attachment step.

Figure 12:
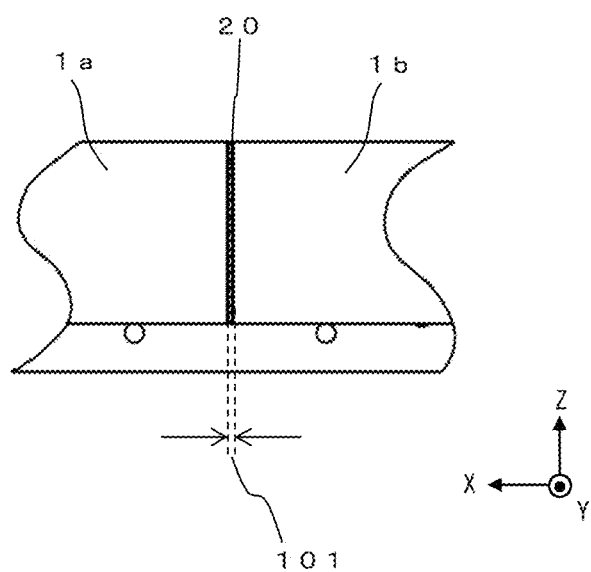
FIG. 12 illustrates a process of the bonding to achieve the lens body bonding structure according to Embodiment 2 of the present disclosure.
Figure 15:
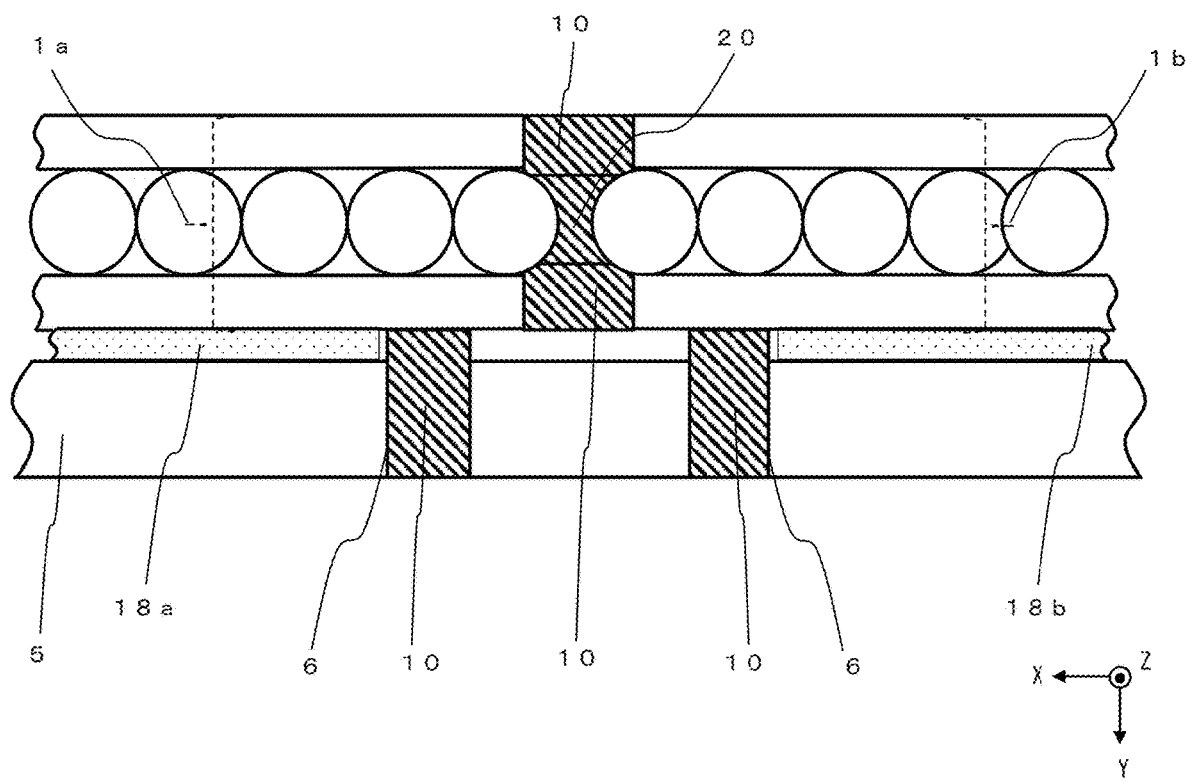
FIG. 15 is a cross-sectional view of the lens body bonding structure according to Embodiment 2 of the present disclosure.
Figure 16:
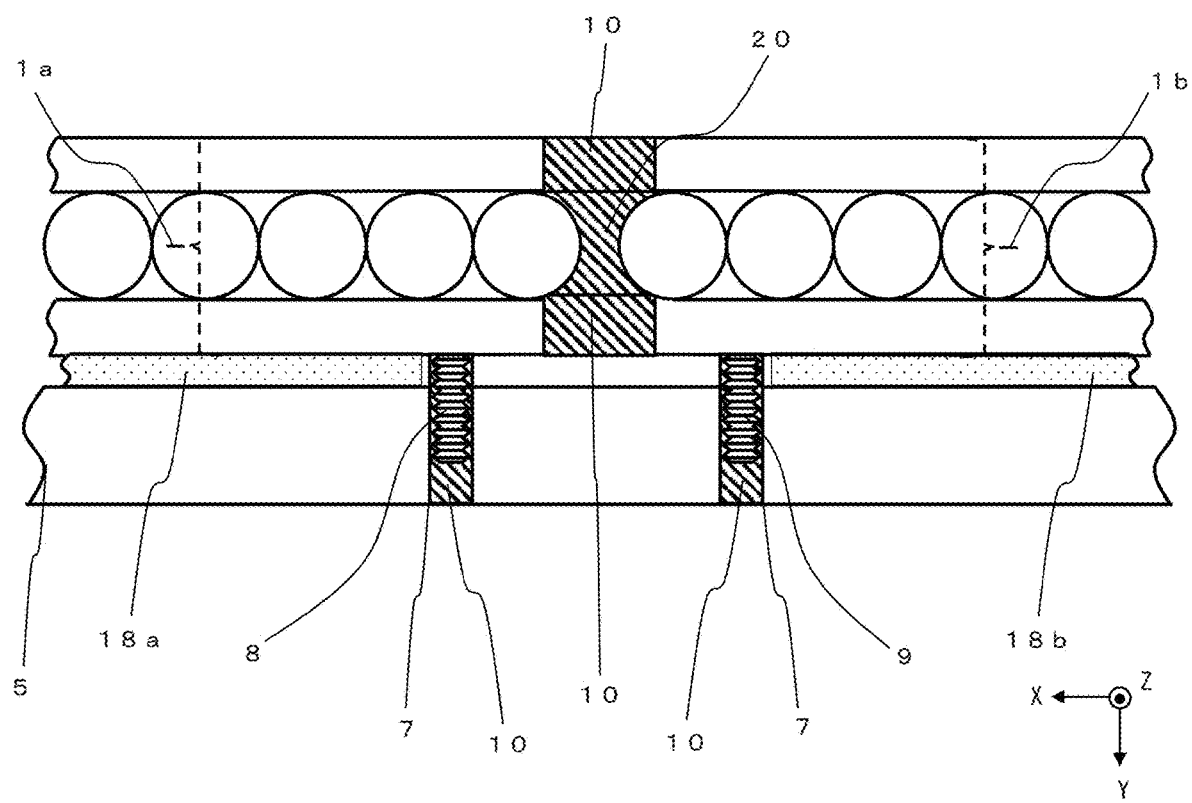
FIG. 16 is a cross-sectional view of the lens body bonding structure according to Embodiment 2 of the present disclosure.
Figure 17:
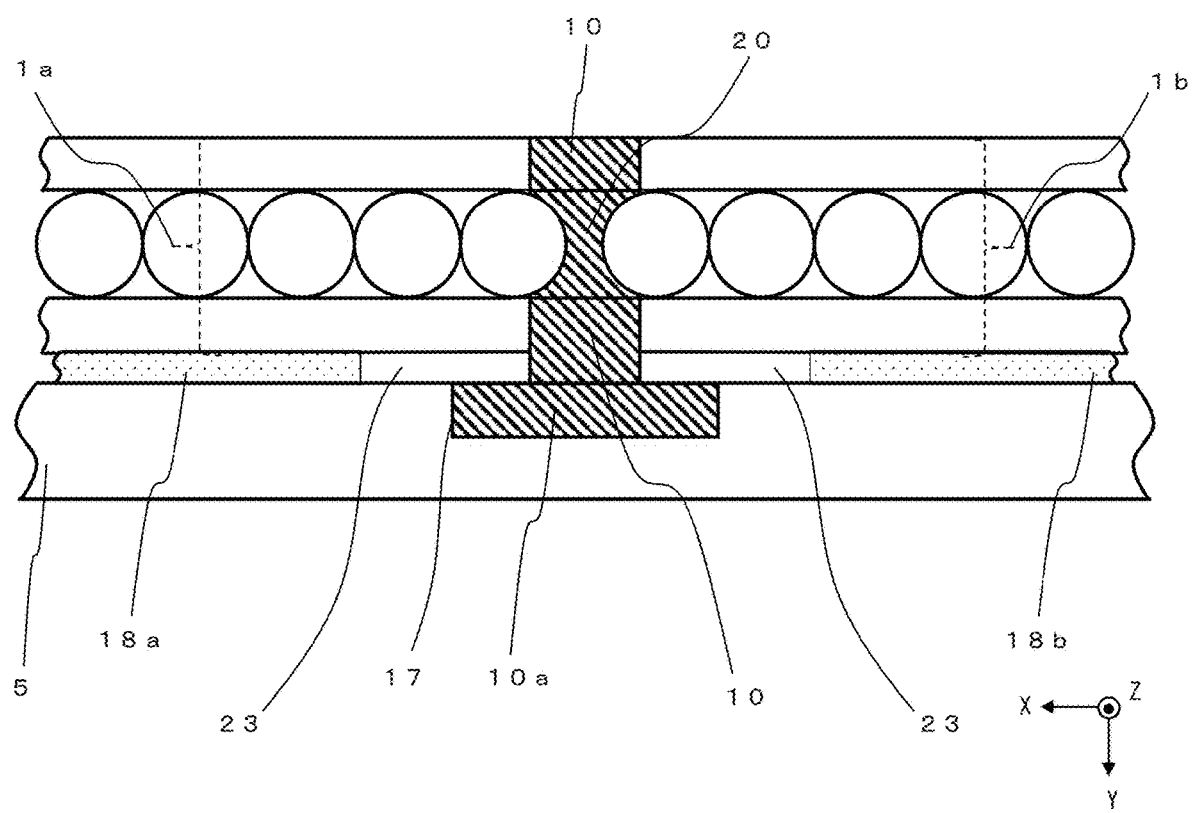
FIG. 17 is a top view of the lens body bonding structure according to Embodiment 2 of the present disclosure.

The lens body bonding method according to Embodiment 2 is a method for obtaining the lens body bonding structure according to Embodiment 2. The lens body bonding method according to Embodiment 2 is a method for, using at least the first lens body 1a of a plurality of lenses that are reduction optics and are arranged linearly in the longitudinal direction and the second lens body 1b of a plurality of lenses that are reduction optics and are arranged linearly in the longitudinal direction, bonding the first lens body 1a and the second lens body 1b to align linearly along the longitudinal direction, as illustrated in FIG. 12. In Embodiment 2, a gap 101 is intentionally disposed between the first lens body 1a and the second lens body 1b. As illustrated in FIGS. 15, 16 and 17, an adhesive 20, which has a glass transition temperature Tg lower than that of the resin portion 10 (the resin 11) and is a soft adhesive, is used to fill the gap 101 to prevent leakage of light from between the first lens body 1a and the second lens body 1b. For example, a silicon-based adhesive can be used as the adhesive 20. In other words, the resin portion 10 (the resin 11) has a glass transition temperature Tg higher than that of the adhesive 20 and is a hard adhesive.

Figure 13:
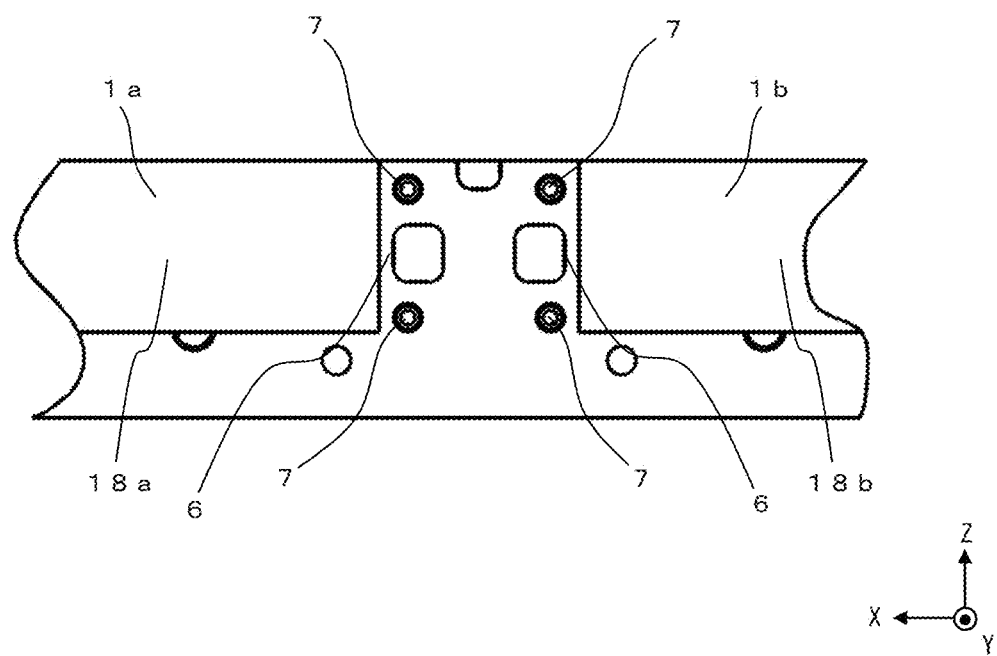
FIG. 13 illustrates a process of the bonding to achieve the lens body bonding structure according to Embodiment 2 of the present disclosure.
Figure 14:
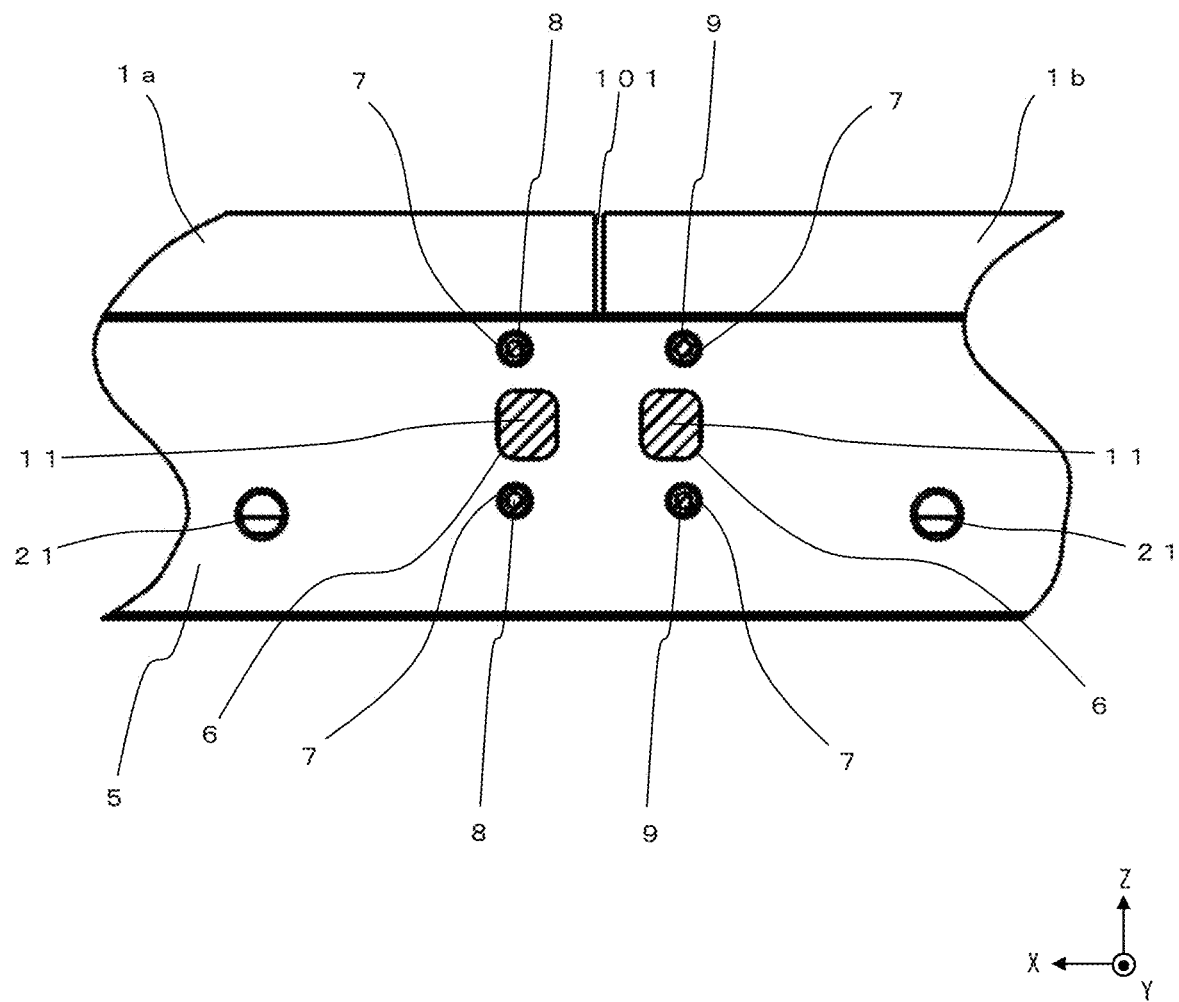
FIG. 14 is a side view of the lens body bonding structure according to Embodiment 2 of the present disclosure.

The lens body fixing step and the lens body reinforcing step are explained in detail with reference to FIG. 13. First, the lens body fixing step is explained. The lens body bonding structure 1 is attached to the lens fixing plate 5. This attachment is performed using the sheet member 18 (the adhesive 18, the adhesive layer 18). FIG. 14 illustrates a state, after attachment of the lens fixing plate 5, in which the resin portion 10 is formed after completion of the resin portion forming step. Although explanation and illustration of the lens body reinforcing step in Embodiment 2 are omitted, the lens body reinforcing step in Embodiment 1 is also applicable to Embodiment 2.

As illustrated in FIG. 11 and other drawings, correction holes 21 are formed in the lens fixing plate 5. These are used in the case of performing a lens fixing plate correction step prior to the lens body fixing step. The lens fixing plate correction step is a step of correcting warpage and deflection of the lens fixing plate 5 in advance. The correction holes 21 are preferably tap holes that are the same as the tap holes 19. This correction of warpage and deflection of the lens fixing plate 5 is performed by fixing the lens fixing plate 5 to a planar-shaped jig using the correction holes 21. In order to avoid application of stress to the junction of the lenses that occurs when the lens fixing plate 5 is moved up and down for alignment of focal points to be performed after insertion into the housing 4, disposing each of the correction holes 21 as a hole disposed at one position is preferable to disposing multiple holes, such as a pair of holes, at one position. The process of the alignment of focal points needs two holes, and disposing one hole at one position can avoid use of the correction holes 21 for the alignment of focal points.

The positions of formation of the correction holes 21 are preferably around the lens fixing plate opening 6 and the holes 7. Specifically, the lens fixing plate opening 6 and the holes 7 are formed in each junction such that, in junctions adjoining in the longitudinal direction, the correction hole 21 in one of the junctions is disposed closer to the lens fixing plate opening 6 and the holes 7 that are formed at the one of the junctions than the correction hole 21 in the other of the junctions, and similarly, in the junctions adjoining in the longitudinal direction, the correction hole 21 in the other of the junctions is disposed closer to the lens fixing plate opening 6 and the holes 7 that are formed at the other of the junctions than the correction hole 21 in the one of the junctions.

The lens body adjustment step is explained in more detail with reference to FIGS. 15-17. FIG. 15 is a cross-sectional view taken at a plane that passes through the lens fixing plate opening 6 and on which the X-axis and the Y-axis intersect. FIG. 15 illustrates a state after formation of the adhesive 20 and the resin portion 10. FIG. 16 is a cross-sectional view taken at a plane that passes through the holes 7 and on which the X-axis and the Y-axis intersect. FIG. 16 illustrates a state in which the first adjustment member 8, that is, the socket set screw 8, is inserted into the hole at the first lens body 1a side, and the second adjustment member 9, that is, the socket set screw 9, is inserted into the hole at the second lens body 1b side.

FIG. 17 is a top view of a plane on which the X-axis and the Y-axis intersect. After the attachment of the lens body bonding structure 1 to the lens fixing plate 5, the socket set screws 8 and the socket set screws 9 to which the anaerobic adhesive is applied are attached to two each of the holes 7 that are disposed in the lens fixing plate 5 along the optical axis direction to face an end portion of the first lens body 1a and an end portion of the second lens body 1b, that is, are attached to four of the holes 7. The positions of the first lens body 1a and the second lens body 1b are adjusted, by using the socket set screws 8 and the socket set screws 9, to align images of the lenses at the portion where the first lens body 1a and the second lens body 1b contact each other. The socket set screws 8 (the first adjustment members 8) (i) contact an end portion of the holding plate extending in the longitudinal direction and holding the first lens body 1a, more specifically, an end portion of the holding plate on a side from which the first lens body 1a is exposed (protrudes) and (ii) adjust the position of the first lens body 1a. The socket set screws 9 (the second adjustment members 9) (i) contact an end portion of the holding plate extending in the longitudinal direction and holding the second lens body 1b, more specifically, an end portion of the holding plate on a side from which the second lens body 1b is exposed (protrudes) and (ii) adjust the position of the second lens body 1b. In FIG. 17, a gap 23 is a gap that is left as a result of adjustment by use of the socket set screws 8 (the first adjustment members 8) and the socket set screws 9 (the second adjustment members 9). A resin for preventing light transmission is applied to the gap 23, as described later.

Upon completion of this adjustment, the resin portion forming step is performed similarly to Embodiment 1. That is to say, filling from the lens fixing plate opening 6 with the resin 11 that is a photosetting adhesive or a two-part curing adhesive (the resin 11 for temporary formation of the resin portion 10) is performed after filling the gap 101 with resin 20, and then after curing of the resin 11, alignment of the images focused separately by the lenses at the junction is checked again. This allows configuration as illustrated in FIG. 15, which can prevent occurrence of blurring of images that may occur in the junction of the lenses such as during handling and can release deformation caused by linear expansion to a part other than the junction of the lenses. The resin 20 and the resin portion 10 may be collectively referred to as "the resin portion 10". Since the gap 101 is disposed between the first lens body 1a and the second lens body 1b in Embodiment 2, occurrence of contact between the first lens body 1a and the second lens body 1b at low temperatures can be prevented even in the case where the lens fixing plate 5 and the first lens body 1a and the second lens body 1b are firmly fixed together. This configuration is suitable for a case in which preventing deformation is difficult when employing the configuration according to Embodiment 1.

As described above, the adhesive 20 that is used to fill the gap 101 has a glass transition temperature Tg lower than that of the resin 11 and is a soft adhesive. The resin 11 may, upon exposure to heat, peel off from the first lens body 1a and the second lens body 1b due to linear expansion. Conversely, the adhesive 20 serves as a pad to prevent tilting of the first lens body 1a and the second lens body 1b. A length of the gap 101 in the longitudinal direction is set within a range that allows overlapping in fields of view of (i) the lens at an end portion of the first lens body 1a (the rod lens exposed from the end portion) and (ii) the lens at an end portion of the second lens body 1b (the rod lens exposed from the end portion), and enables the acquiring of a necessary amount of light. The length of the gap 101 in the longitudinal direction is, in view of linear expansion, calculated using the linear expansion coefficient of a material of the lens fixing plate 5 and the linear expansion coefficients of the first lens body 1a and the second lens body 1b (FIG. 15).

The adjustment member fixing step is explained with reference to FIG. 16. In order to prevent unintended turning of the socket set screws 8 and the socket set screws 9, a photosetting adhesive or a two-part curing adhesive is applied to four of the holes 7. After curing of the photosetting adhesive or the two-part curing adhesive, a resin for preventing light transmission is applied to each of (i) the junction of the first lens body 1a and the second lens body 1b and (ii) the gap 23. Since this resin need not have mechanical strength, a black silicone resin that does not transmit light or a resin similar thereto is preferable as this resin. Excess of the resin 11 is stored in the hollow 17 and serves as the second resin portion 10a, as illustrated in FIG. 17.

The lens body bonding structure 1 (the lens body 1) in the lens body bonding method according to Embodiment 2 may be the rod lens array 1. In the case of this configuration, each of the first lens body 1a and the second lens body 1b is the rod lens array 1 including a plurality of rod lenses arranged linearly and sandwiched by the holding plates extending in the longitudinal direction, and the lens body fixing step is a step of, using the adhesive 20 and the resin 11 such as the resin portion 10 around the adhesive 20 or the like, fixing the first lens body 1a and the second lens body 1b such that a rod lens exposed from an end portion of the first lens body 1a in the longitudinal direction and a rod lens exposed from an end portion of the second lens body 1b in the longitudinal direction face each other while obtaining the gap 101.

Figure 18:
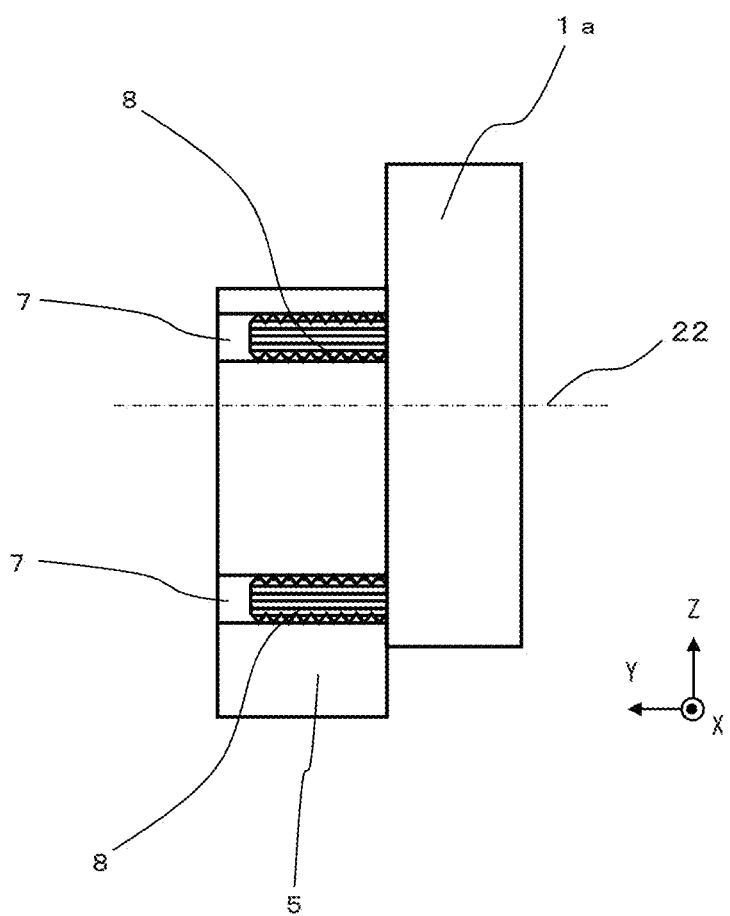
FIG. 18 is a cross-sectional view of the lens body bonding structure according to Embodiment 2 of the present disclosure, that is, a cross-sectional view as viewed in the longitudinal direction.

FIG. 18 is a cross-sectional view of the lens body bonding structure according to Embodiment 2 that is a view of a cross section taken along the Y-axis and the Z-axis, in other words, a cross-sectional view as viewed in the longitudinal direction. Although FIG. 18 illustrates a cross section taken at a position at which the holes 7 at the first lens body 1a side and the first adjustment members 8 are disposed, due to similarity, a cross section taken at a position at which the holes 7 at the second lens body 1b side and the second adjustment members 9 are disposed is not illustrated. The dashed-dotted line 22 of FIG. 18 is a lens body center line 22 in the cross section defined by the Y-axis and the Z-axis. In the case of the configuration in which two or more of the holes 7 are disposed at an end of the first lens body 1a as illustrated in FIG. 18 and at an end of the second lens body 1b, disposing the holes 7 so as to be axisymmetric with respect to the center of the Z-axis direction (the optical axis direction), that is, the lens body center line 22, is preferable. In the first lens body 1a and the second lens body 1b, at least one of the holes 7 is disposed at each of the upper half and the lower half thereof.

According to the lens body bonding structure, the image reading device, and the lens body bonding method (the method for manufacturing the image reading device) according to Embodiment 2, processes are performed that have a high degree of difficulty in application over the entirety of the longitudinal direction, that is, over the entire length. Further, leakage of light can be easily prevented by using, as an adhesive for filling gaps, the adhesive 20 that has a low glass transition temperature Tg and is a soft adhesive.

As described above, in the lens body bonding structure according to Embodiment 1 and Embodiment 2, the holes 7 are formed in the lens fixing plate 5 in the lateral direction intersecting the optical axis direction and the longitudinal direction so as to sandwich, when viewed in the lateral direction, the junction of the first lens body 1a and the second lens body 1b such that at least one of the holes 7 is provided for each of the first lens body 1a and the second lens body 1b. Similarly, the lens fixing plate opening 6 is at least one opening formed in the lens fixing plate 5 in the lateral direction, at a position sandwiched by the holes 7 that are disposed so as to sandwich the junction of the first lens body 1a and the second lens body 1b such that at least one of the holes 7 is provided for each of the first lens body 1a and the second lens body 1b.

As described above, the lens body bonding method according to Embodiments 1 and 2 includes the lens body fixing step that is a step of fixing the first lens body 1a and the second lens body 1b to, using the adhesive layer 18, the surface of the lens fixing plate 5 determined by intersection of the straight line in the optical axis direction of the first lens body 1a and the second lens body 1b and the straight line in the longitudinal direction, such that the lens fixing plate 5 in which the lens fixing plate opening 6 is formed in the lateral direction intersecting the optical axis direction and the longitudinal direction overlaps, when viewed in the lateral direction, at least a portion of the junction at which the first lens body 1a and the second lens body 1b are bonded to each other.

Further, as described above, the lens body bonding method according to Embodiment 1 and Embodiment 2 includes the lens body adjustment step that is a step of adjusting positions of the first lens body 1a and the second lens body 1b by (i) bringing the first adjustment member 8 into contact with the first lens body 1a via at least one hole into which the first adjustment member 8 is inserted and that is included in the holes 7 formed in the lens fixing plate 5 in the lateral direction so as to sandwich, when viewed in the lateral direction, the junction at which the first lens body 1*a* and the second lens body 1*b* are bonded to each other such that at least one of the holes is provided for each of the first lens body 1*a* and the second lens body 1*b*, (ii) bringing the second adjustment member 9 into contact with the second lens body 1*b* via at least one hole that is included in the holes 7 and into which the second adjustment member 9 is inserted, and (iii) moving at least one of the first adjustment member 8 or the second adjustment member 9 forward or backward along the lateral direction.

According to the lens body bonding structure, the image reading device, and the lens body bonding method (the method for manufacturing the image reading device) according to Embodiments 1 and 2, use of a double-faced adhesive tape with the same adhesive strength over the entire length, including the junction of the lenses, is not needed. This prevents application of stress to the junction of the lenses caused by linear expansion of a structure such as a frame due to a change in ambient temperature, thereby preventing the occurrence of blurring of images. Thus, the configuration can be achieved that enables, even in the case where the lenses have a long conjugate length, (i) easy adjustment of images of the lenses at the junction, (ii) reduction of the effect of warpage of surrounding structure to the lenses, and (iii) adjustment of the conjugate length after assembly, while achieving reduction of the effect of warpage of surrounding structure to the lenses and achieving sufficient dust-proofness.

REFERENCE SIGNS LIST

1 Lens body bonding structure (Lens body, Rod lens array)
1*a* First lens body (First rod lens array)
1*b* Second lens body (Second rod lens array)
2 Image reading device
3 Sensor
3*a* Sensor array
4 Housing
4*a* Reinforcing plate relief portion
4*b* Housing holder
4*c* Housing screw hole
5 Lens fixing plate (Lens fixing board)
5*a* Projecting portion
6 Lens fixing plate opening
7 Hole
8 First adjustment member
9 Second adjustment member
10 Resin portion
10*a* Second resin portion
11 Resin
12 Reinforcing plate (Reinforcing board)
12*a* Reinforcing plate recess
13 Transparent body
14 Sensor board
15 Board
16 Board support plate
17 Hollow
18 Sheet member (Adhesive, Adhesive layer)
18*a* Sheet member (Adhesive layer)
18*b* Sheet member (Adhesive layer)
18*c* Sheet member (Adhesive layer)
18*d* Sheet member (Adhesive layer)
18*e* Sheet member (Adhesive layer)
19 Tap hole
20 Adhesive
21 Correction hole
22 Lens body center line
23 Gap
101 Gap

The invention claimed is:

1. A lens body bonding structure at least including a first lens body of a plurality of lenses arranged linearly in a longitudinal direction and a second lens body of a plurality of lenses arranged linearly in the longitudinal direction and in which the first lens body and the second lens body are bonded to each other to align linearly along the longitudinal direction, the lens body bonding structure further comprising:
a lens fixing plate that supports, on a surface determined by intersection of a straight line in an optical axis direction of the first lens body and the second lens body and a straight line in the longitudinal direction, the first lens body and the second lens body;
holes that are formed in the lens fixing plate in a lateral direction intersecting the optical axis direction and the longitudinal direction so as to sandwich, when viewed in the lateral direction, a junction of the first lens body and the second lens body such that at least one of the holes is provided for each of the first lens body and the second lens body;
a lens fixing plate opening that is at least one opening formed in the lens fixing plate in the lateral direction, at a position sandwiched by the holes that are disposed so as to sandwich the junction such that at least one of the holes is provided for each of the first lens body and the second lens body;
a first adjuster that is inserted into the hole and contacts the first lens body;
a second adjuster that is inserted into the hole and contacts the second lens body; and
a resin portion of resin filling a space between (i) the first lens body and the second lens body and (ii) the lens fixing plate opening.

2. The lens body bonding structure according to claim 1, wherein
the lens fixing plate opening overlaps at least a portion of the junction when viewed in the lateral direction, and
the holes are formed in the lens fixing plate such that at least one of the holes is disposed at each of a front and rear of the lens fixing plate opening in the longitudinal direction.

3. The lens body bonding structure according to claim 1, wherein the lens fixing plate opening is a plurality of the lens fixing plate openings that are disposed so as to align with the holes along the optical axis direction when viewed in the lateral direction or disposed so as to be positioned on a side of the junction with respect to the holes in the optical axis direction when viewed in the lateral direction.

4. The lens body bonding structure according to claim 1, wherein the first lens body is positioned by the first adjuster and the second lens body is positioned by the second adjuster.

5. The lens body bonding structure according to claim 1, wherein at least one of the first adjuster or the second adjuster is movable forward and backward along the lateral direction.

6. The lens body bonding structure according to claim 1, further comprising:
a reinforcing plate that supports, on a surface determined by intersection of a straight line in the optical axis direction and a straight line in the longitudinal direction, the junction of the first lens body and the second lens body, wherein the reinforcing plate is arranged on a side opposite to the lens fixing plate in the lateral direction.

7. The lens body bonding structure according to claim 6, wherein the reinforcing plate has a length in the longitudinal direction shorter than a length of the lens fixing plate in the longitudinal direction.

8. The lens body bonding structure according to claim 6, wherein the reinforcing plate includes, at a portion thereof facing in the lateral direction a position that includes at least a portion of the junction of the first lens body and the second lens body, a reinforcing plate recess.

9. The lens body bonding structure according to claim 8, wherein the reinforcing plate recess is a groove formed along the optical axis direction.

10. The lens body bonding structure according to claim 1, wherein
the lens fixing plate further includes a hollow on a surface thereof determined by intersection of a straight line in the longitudinal direction and a straight line in the lateral direction, at at least a position that is close to the first lens body and the second lens body and is different from, in the optical axis direction, a position at which the lens fixing plate opening is formed, and
a second resin portion that is continuous with the resin portion is formed in at least a portion of the hollow.

11. The lens body bonding structure according to claim 6, wherein
the lens body bonding structure includes an adhesive layer at at least one of:
a portion between (i) the first lens body and the second lens body and (ii) the lens fixing plate or
a portion between (i) the first lens body and the second lens body and (ii) the reinforcing plate.

12. The lens body bonding structure according to claim 1, wherein
each of the first lens body and the second lens body is a rod lens array including a plurality of rod lenses arranged linearly and sandwiched by holding plates extending in the longitudinal direction, and
the resin portion is formed between a rod lens at an end portion of the first lens body and a rod lens at an end portion of the second lens body that face each other in the longitudinal direction.

13. An image reading device including the lens body bonding structure according to claim 1, to focus and receive reflected light or transmitted light from a reading target using the first lens body and the second lens body, the image reading device comprising:
a sensor that includes a sensor array for receiving light from the first lens body and the second lens body; and
a housing that supports the sensor and the lens body bonding structure.

14. The image reading device according to claim 13, wherein
the lens body bonding structure further includes a reinforcing plate that supports, on a surface determined by intersection of a straight line in the optical axis direction and a straight line in the longitudinal direction, the junction of the first lens body and the second lens body, the reinforcing plate being arranged on a side opposite to the lens fixing plate in the lateral direction, and
the housing supports the lens fixing plate and defines a space with the reinforcing plate.

15. A lens body bonding method using at least a first lens body of a plurality of lenses arranged linearly in a longitudinal direction and a second lens body of a plurality of lenses arranged linearly in the longitudinal direction and in which the first lens body and the second lens body are bonded to each other to align linearly along the longitudinal direction, the lens body bonding method comprising:
a lens body fixing step of fixing the first lens body and the second lens body to, using an adhesive layer, a surface of a lens fixing plate determined by intersection of a straight line in an optical axis direction of the first lens body and the second lens body and a straight line in the longitudinal direction, such that the lens fixing plate in which a lens fixing plate opening is formed in the lateral direction intersecting the optical axis direction and the longitudinal direction overlaps, when viewed in the lateral direction, at least a portion of a junction at which the first lens body and the second lens body are bonded to each other;
a lens body adjustment step of adjusting positions of the first lens body and the second lens body by
bringing a first adjuster into contact with the first lens body via at least one hole into which the first adjuster is inserted, the at least one hole included in holes formed in the lens fixing plate in the lateral direction so as to sandwich, when viewed in the lateral direction, the junction such that at least one of the holes is provided for each of the first lens body and the second lens body,
bringing a second adjuster into contact with the second lens body via at least one hole that is included in the holes and into which the second adjuster is inserted, and
moving at least one of the first adjuster adjustment member or the second adjuster forward or backward along the lateral direction; and
a resin portion forming step of injecting resin through the lens fixing plate opening and filling with the resin a space between (i) the first lens body and the second lens body and (ii) the lens fixing plate opening.

16. The lens body bonding method according to claim 15, wherein the lens body fixing step is a step of fixing the first lens body and the second lens body to, using the adhesive layer, the surface of the lens fixing plate determined by intersection of the straight line in the optical axis direction and the straight line in the longitudinal direction, such that the lens fixing plate opening overlaps, when viewed in the lateral direction, at least a portion of the junction.

17. The lens body bonding method according to claim 15, wherein the lens body fixing step is a step of fixing the first lens body and the second lens body to, using the adhesive layer, the surface of the lens fixing plate determined by intersection of the straight line in the optical axis direction and the straight line in the longitudinal direction, such that the lens fixing plate opening is misaligned with the junction when viewed in the lateral direction.

18. The lens body bonding method according to claim 15, wherein, in the lens body adjustment step, adjustment of the positions of the first lens body and the second lens body is performed by using two or more each of (i) the first adjuster disposed along the optical axis direction and (ii) the second adjuster disposed along the optical axis direction.

19. The lens body bonding method according to claim 15, further comprising:
a lens body reinforcing step of fixing, using an adhesive layer, to a reinforcing plate the junction at which the first lens body and the second lens body are bonded to each other, on a surface determined by intersection of a straight line in the optical axis direction and a straight line in the longitudinal direction,
wherein, in the lens body reinforcing step, the reinforcing plate is disposed at a position opposite to the lens fixing plate in the lateral direction and fixes the junction at which the first lens body and the second lens body are bonded to each other.

20. The lens body bonding method according to claim 19, wherein the reinforcing plate used in the lens body reinforcing step includes, at a portion thereof facing in the lateral direction a position that includes at least a portion of the junction at which the first lens body and the second lens body are bonded to each other, a reinforcing plate recess that is a groove formed along the optical axis direction.

21. The lens body bonding method according to claim 15, wherein, in the resin portion forming step, excess of the resin injected through the lens fixing plate opening is stored in a hollow that is formed in the lens fixing plate on a surface determined by intersection of a straight line in the longitudinal direction and a straight line in the lateral direction, at at least a position that is close to the first lens body and the second lens body and is different from, in the optical axis direction, a position at which the lens fixing plate opening is formed.

22. The lens body bonding method according to claim 15, wherein
each of the first lens body and the second lens body is a rod lens array including a plurality of rod lenses arranged linearly and sandwiched by holding plates extending in the longitudinal direction, and
in the lens body fixing step, the first lens body and the second lens body are fixed such that a rod lens included in the plurality of rod lenses and exposed from an end portion of the first lens body in the longitudinal direction and a rod lens included in the plurality of rod lenses and exposed from an end portion of the second lens body in the longitudinal direction face each other.

23. The lens body bonding method according to claim 22, wherein, in the resin portion forming step, the resin is filled in a space between the rod lens exposed from the end portion of the first lens body in the longitudinal direction and the rod lens exposed from the end portion of the second lens body in the longitudinal direction.

24. The lens body bonding method according to claim 15, further comprising:
an adjuster fixing step,
wherein the adjuster fixing step is a step of fixing, after at least the lens body adjustment step, the first adjuster and the second adjuster to the holes.

25. A lens body bonding structure at least including a first lens body of a plurality of lenses arranged linearly in a longitudinal direction and a second lens body of a plurality of lenses arranged linearly in the longitudinal direction and in which the first lens body and the second lens body are bonded to each other to align linearly along the longitudinal direction, the lens body bonding structure further comprising:
a lens fixing plate that supports, on a surface determined by intersection of a straight line in an optical axis direction of the first lens body and the second lens body and a straight line in the longitudinal direction, the first lens body and the second lens body;
a lens fixing plate opening that is an opening formed in the lens fixing plate in a lateral direction intersecting the optical axis direction and the longitudinal direction and overlaps at least a portion of the junction of the first lens body and the second lens body when viewed in the lateral direction;
holes that are formed in the lens fixing plate such that at least one of the holes is disposed at each of a front and rear of the lens fixing plate opening in the longitudinal direction;
a first adjuster that is inserted into the hole and contacts the first lens body;
a second adjuster that is inserted into the hole and contacts the second lens body; and
a resin portion of resin filling a space between (i) the first lens body and the second lens body and (ii) the lens fixing plate opening.

* * * * *